(12) United States Patent
Miyajima

(10) Patent No.: US 12,554,126 B2
(45) Date of Patent: Feb. 17, 2026

(54) LIGHT SCANNING APPARATUS AND IMAGE FORMING APPARATUS

(71) Applicant: CANON KABUSHIKI KAISHA, Tokyo (JP)

(72) Inventor: Yu Miyajima, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 18/340,048

(22) Filed: Jun. 23, 2023

(65) Prior Publication Data

US 2024/0019691 A1    Jan. 18, 2024

(30) Foreign Application Priority Data

Jul. 13, 2022 (JP) ................. 2022-112257

(51) Int. Cl.
G02B 26/12     (2006.01)
G03G 15/04     (2006.01)

(52) U.S. Cl.
CPC ..... *G02B 26/125* (2013.01); *G03G 15/04036* (2013.01)

(58) Field of Classification Search
CPC ................. G02B 26/125; G03G 15/04036
See application file for complete search history.

(56) References Cited

U.S. PATENT DOCUMENTS

| | | | |
|---|---|---|---|
| 10,012,938 B2 | 7/2018 | Miyajima | |
| 10,054,790 B2 | 8/2018 | Sumida | |
| 10,401,770 B2 | 9/2019 | Miyajima | |
| 10,670,984 B2 | 6/2020 | Miyajima | |
| 10,754,148 B2 | 8/2020 | Teramura | |
| 10,761,450 B2 | 9/2020 | Teramura | |
| 10,908,544 B2 | 2/2021 | Miyajima | |
| 11,381,703 B2 | 7/2022 | Miyajima | |
| 2016/0202393 A1 | 7/2016 | Saiga | |
| 2016/0223812 A1* | 8/2016 | Kudo | ..... H04N 1/113 |
| 2021/0314462 A1* | 10/2021 | Yatabe | ..... G02B 27/0031 |

FOREIGN PATENT DOCUMENTS

JP    H11-6972 A    1/1999

* cited by examiner

*Primary Examiner* — Lucy P Chien
(74) *Attorney, Agent, or Firm* — Carter, DeLuca & Farrell LLP

(57) ABSTRACT

Provided is a light scanning apparatus wherein each of optical surfaces of an imaging optical element includes an effective portion on which a light flux traveling toward an effective region of a scanned surface is incident, and two non-effective portions provided on both sides in main scanning direction of effective portion, wherein, when each of a change in a sagittal line tilt amount and a change in a sagittal line curvature in main scanning direction on at least one of optical surfaces is represented by a function, at least one of functions is continuous and is not infinitely differentiable at a predetermined position on each of two non-effective portions, and wherein, with respect to at least one of sagittal line tilt amount and sagittal line curvature, an absolute value at a first end of non-effective portion on a side opposite to effective portion is smaller than that at predetermined position.

15 Claims, 10 Drawing Sheets

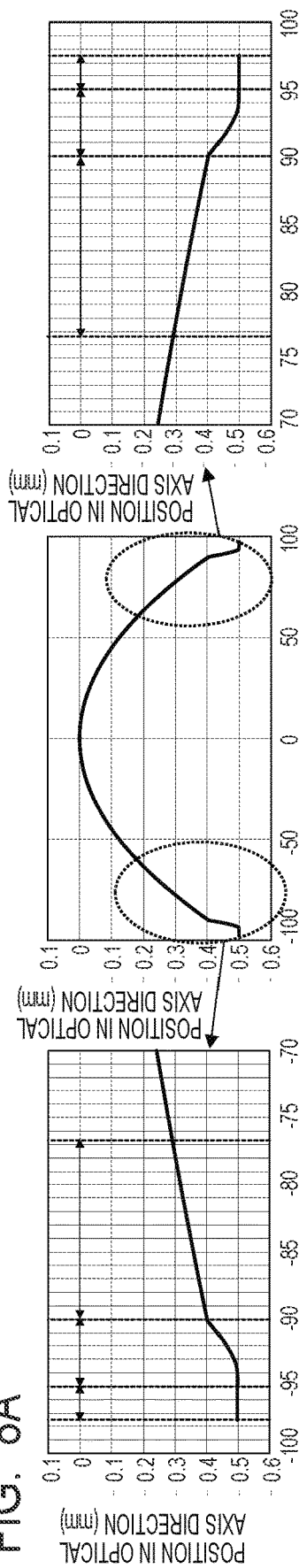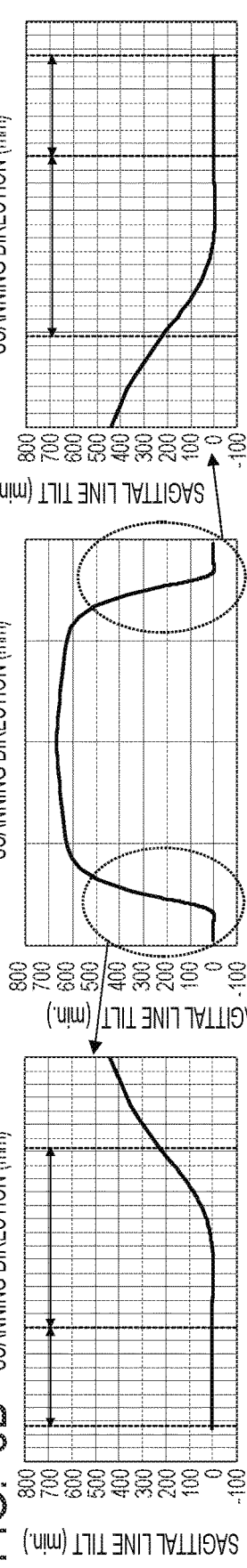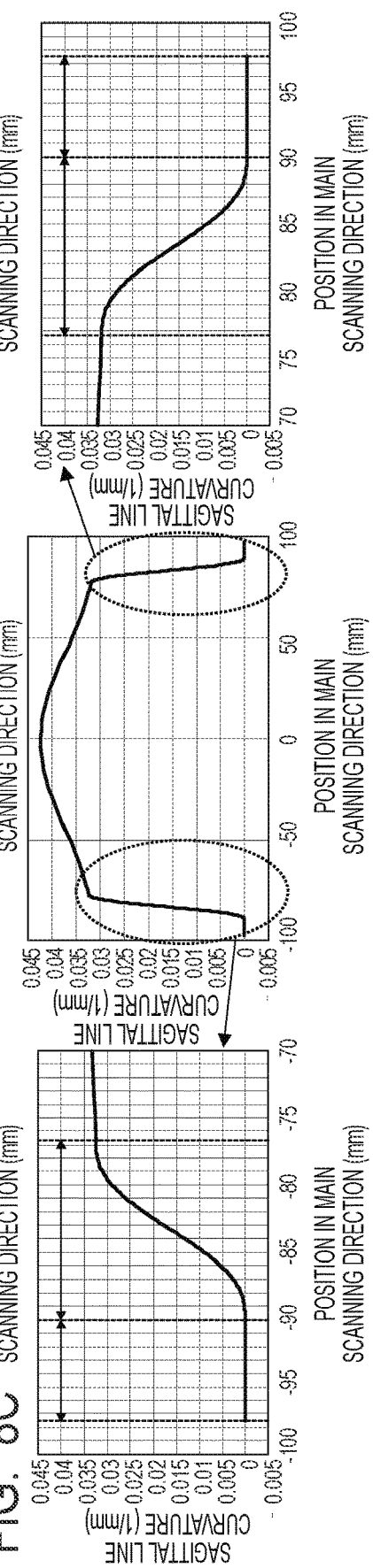

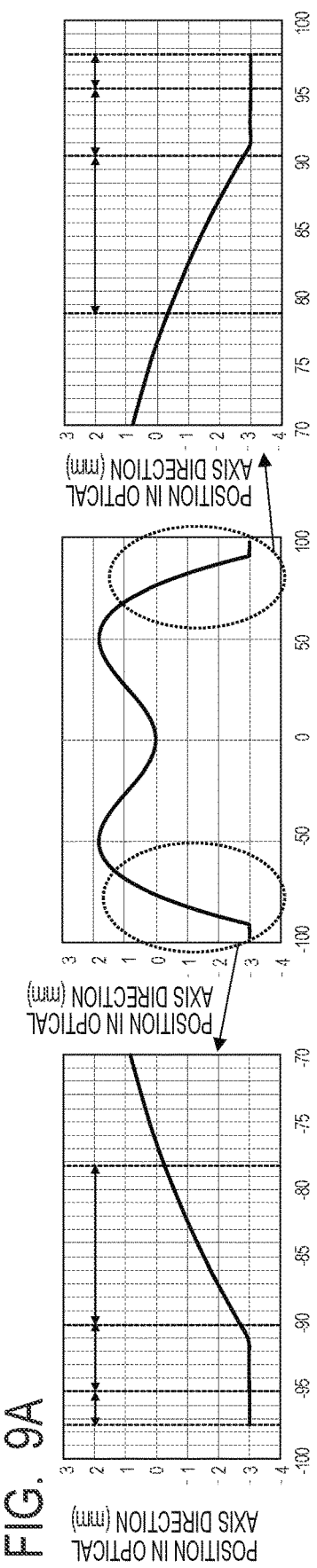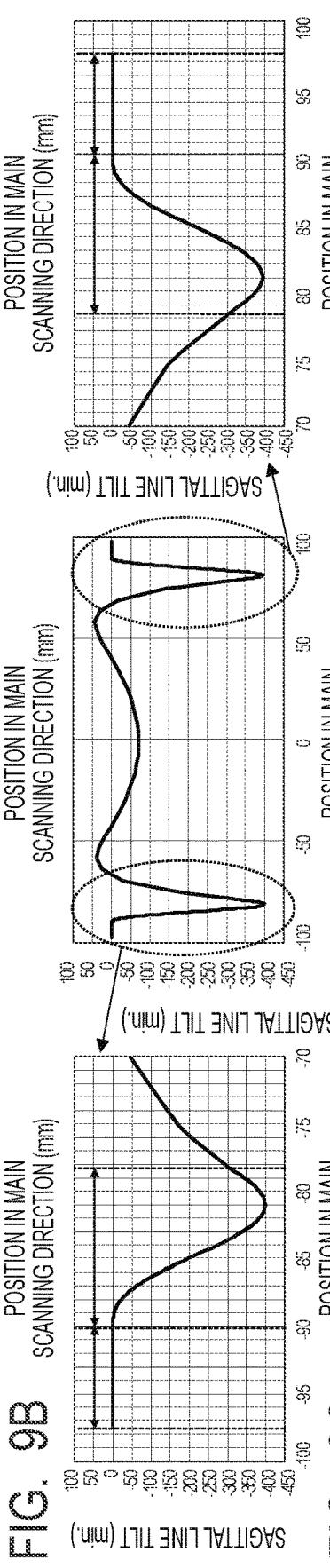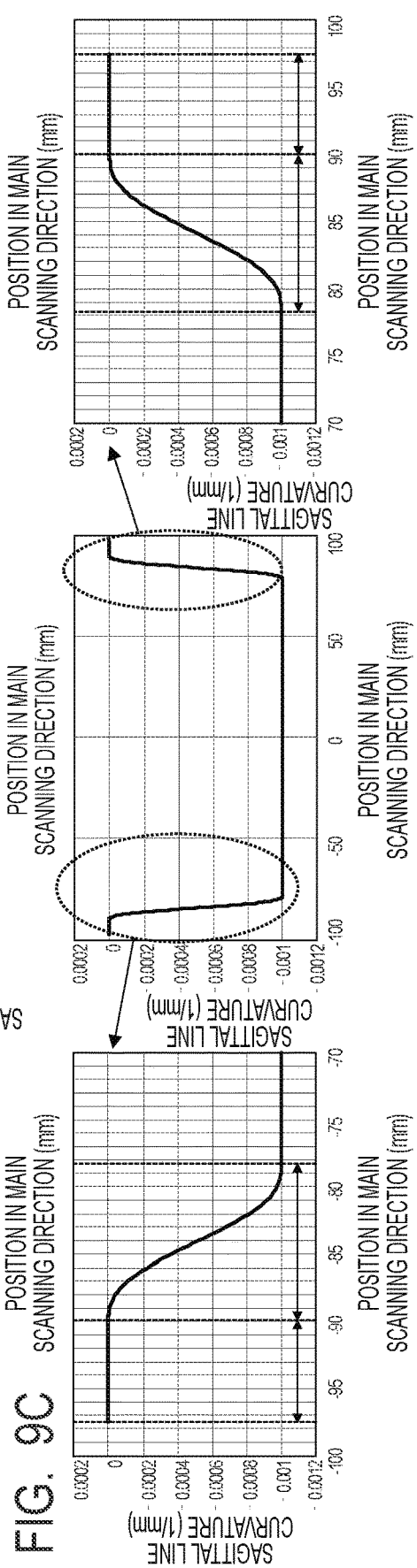

LIGHT SCANNING APPARATUS AND IMAGE FORMING APPARATUS

BACKGROUND OF THE INVENTION

Field of the Invention

The present invention relates to a light scanning apparatus, and in particular, it is related to a light scanning apparatus suitable for an image forming apparatus such as a laser beam printer (LBP), a digital copying machine and a multi-functional printer (MFP).

Description of the Related Art

Conventionally, it is known that a deformation of an optical surface occurs due to a mold release or a shrinkage when an imaging optical element is molded, which causes a deterioration in printing performance when the imaging optical element is mounted on the light scanning apparatus.

Japanese Patent Application Laid-Open No. H11-6972 discloses an imaging optical element in which a meridional line shape of a non-effective portion of an optical surface is represented by a function obtained by adding a spline function to a function representing the meridional line shape of an effective portion of the optical surface to appropriately secure a thickness in the non-effective portion, thereby suppressing the deformation of the optical surface due to the mold release or the shrinkage during molding.

In the imaging optical element disclosed in Japanese Patent Application Laid-Open No. H11-6972, the thickness continuously changes between the non-effective portion and an outer portion in a main scanning cross section including an optical axis of the imaging optical element by designing a shape (meridional line shape) of the non-effective portion in the main scanning cross section including the optical axis as described above.

However, since the optical surface of the imaging optical element disclosed in Japanese Patent Application Laid-Open No. H11-6972 has a curvature (a sagittal line curvature) in a sub-scanning cross section, a discontinuous change in thickness occurs between the non-effective portion and the outer portion in the main scanning cross section which does not include the optical axis.

By undergoing such discontinuous change in thickness in the imaging optical element, a step is formed between the non-effective portion and the outer portion in accordance with a position in a sub-scanning direction, so that the deformation of the optical surface due to the mold release or the shrinkage when molding the imaging optical element is not sufficiently suppressed yet.

Further, by undergoing such discontinuous change in thickness in the imaging optical element, a flow path of a resin when molding the imaging optical element changes in accordance with the position in the sub-scanning direction, so that a large birefringence may occur in the effective portion of the optical surface.

In addition, in recent years, the imaging optical element in which the shape of the optical surface in the sub-scanning cross section has an inclination, namely a sagittal line tilt is frequently used, and the step is formed between the non-effective portion and the outer portion, so that the deformation of the optical surface or the large birefringence as described above may occur even in such imaging optical element.

SUMMARY OF THE INVENTION

An object of the present invention is to provide a light scanning apparatus including an imaging optical element in which a deformation and a birefringence of an optical surface are sufficiently suppressed.

The light scanning apparatus according to the present invention includes a deflecting unit configured to deflect a light flux to scan an effective region of a scanned surface in a main scanning direction, and an imaging optical element configured to guide the light flux deflected by the deflecting unit to the effective region. Each of optical surfaces of the imaging optical element includes an effective portion on which the light flux traveling toward the effective region is incident, and two non-effective portions provided on both sides in the main scanning direction of the effective portion. When each of a change in a sagittal line tilt amount and a change in a sagittal line curvature in the main scanning direction on at least one of the optical surfaces is represented by a function, at least one of the functions is continuous and is not infinitely differentiable at a predetermined position on each of the two non-effective portions. With respect to at least one of the sagittal line tilt amount and the sagittal line curvature, an absolute value at a first end of each of the two non-effective portions on a side opposite to the effective portion is smaller than an absolute value at the predetermined position on each of the two non-effective portions.

Further features of the present invention will become apparent from the following description of exemplary embodiments with reference to the attached drawings.

BRIEF DESCRIPTION OF THE DRAWINGS

FIG. 8A is a graph showing a positional dependence in the main scanning direction of the meridional line shape of the incident surface of the second fθ lens in the one embodiment of the present invention.

FIG. 8B is a graph showing a positional dependence in the main scanning direction of the sagittal line tilt of the incident surface of the second fθ lens in the one embodiment of the present invention.

FIG. 8C is a graph showing a positional dependence in the main scanning direction of the sagittal line curvature of the incident surface of the second fθ lens in the one embodiment of the present invention.

FIG. 9A is a graph showing a positional dependence in the main scanning direction of the meridional line shape of the exit surface of the second fθ lens in the one embodiment of the present invention.

FIG. 9B is a graph showing a positional dependence in the main scanning direction of the sagittal line tilt of the exit surface of the second fθ lens in the one embodiment of the present invention.

FIG. 9C is a graph showing a positional dependence in the main scanning direction of the sagittal line curvature of the exit surface of the second fθ lens in the one embodiment of the present invention.

DESCRIPTION OF THE EMBODIMENTS

Hereinafter, a light scanning apparatus according to the present invention will be described in detail with reference to the accompanying drawings. Note that the drawings described below may be drawn on a scale different from the actual scale in order to facilitate understanding of the present invention.

In the following description, a main scanning direction is a direction in which a light flux is deflected for scanning by a deflecting unit. A sub-scanning direction is a direction parallel to a rotation axis of the deflecting unit. A main scanning cross section is a cross section perpendicular to the sub-scanning direction. A sub-scanning cross section is a cross section perpendicular to the main scanning direction.

Figure 1A:
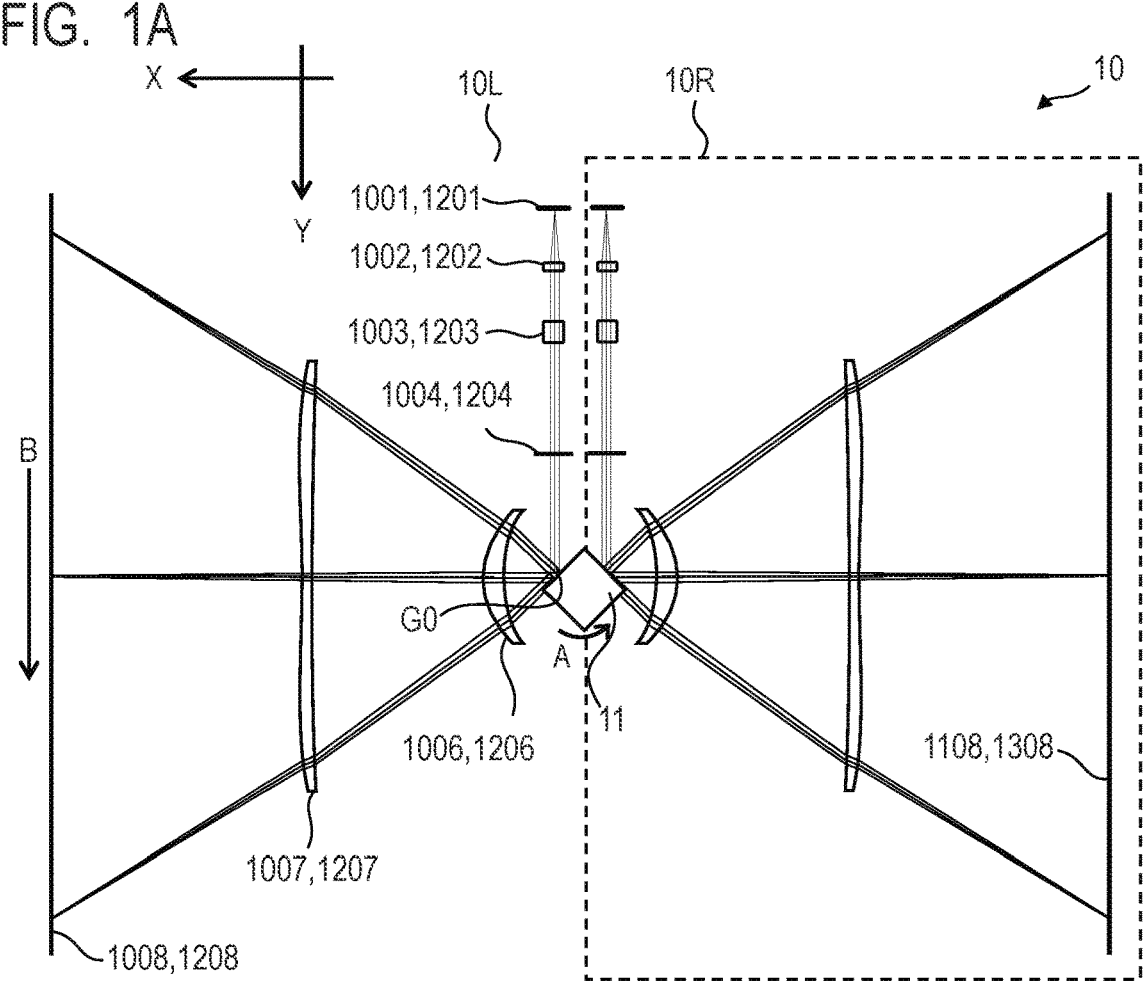
FIG. 1A is a developed view in the main scanning cross section of the light scanning apparatus according to one embodiment of the present invention.

FIG. 1A shows a developed view in the main scanning cross section of the light scanning apparatus 10 according to one embodiment of the present invention.

Figure 1B:
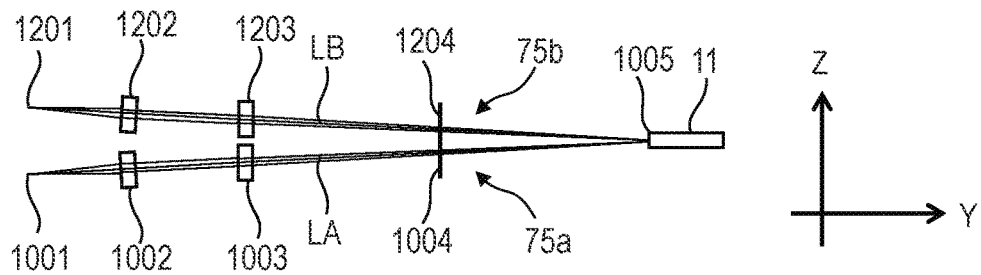
FIG. 1B is a partially developed view in the sub-scanning cross section of the light scanning apparatus according to the one embodiment of the present invention.
Figure 1C:
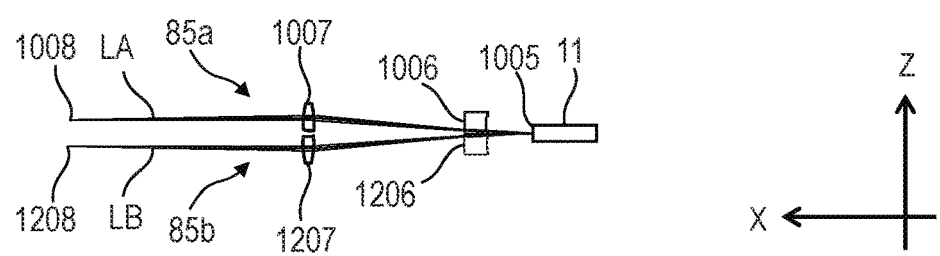
FIG. 1C is a partially developed view in the sub-scanning cross section of the light scanning apparatus according to the one embodiment of the present invention.

FIGS. 1B and 1C show developed views in the sub-scanning cross section of an incident optical system and a scanning optical system included in the light scanning apparatus 10 according to the one embodiment of the present invention, respectively.

The light scanning apparatus 10 includes a left scanning system 10L and a right scanning system 10R that have the same structure and are arranged symmetrically with respect to the deflecting unit 11.

The left scanning system 10L and the right scanning system 10R scan first and second scanned surfaces 1008 and 1208, and third and fourth scanned surfaces 1108 and 1308, respectively, in an opposed manner.

Accordingly, since the structure described below can be similarly applied to both of the left scanning system 10L and the right scanning system 10R, only the left scanning system 10L will be described below in order to simplify the description.

The light scanning apparatus 10 according to the one embodiment of the present invention includes first and second light sources 1001 and 1201, and first and second collimating lenses 1002 and 1202.

Further, the light scanning apparatus 10 includes first and second cylindrical lenses 1003 and 1203, and first and second aperture stops 1004 and 1204.

Furthermore, the light scanning apparatus 10 includes the deflecting unit 11, and first fθ lenses 1006 and 1206 (imaging optical elements).

In addition, the light scanning apparatus 10 includes second fθ lenses 1007 and 1207 (imaging optical elements).

As the first and second light sources 1001 and 1201, semiconductor lasers or the like are used. Each of light fluxes LA and LB (first and second light fluxes) emitted from the first and second light sources 1001 and 1201 has a linear polarization substantially parallel to the main scanning cross section. That is, the light fluxes LA and LB incident on the deflecting unit 11 from the first and second light sources 1001 and 1201 have a p-polarized component larger than an s-polarized component at the time of reflection by the deflecting surface 1005 of the deflecting unit 11.

The first and second collimating lenses 1002 and 1202 convert the light fluxes LA and LB emitted from the first and second light sources 1001 and 1201 into parallel light fluxes, respectively. The parallel light flux referred herein includes not only a strictly parallel light flux but also a substantially parallel light flux such as a weakly divergent light flux or a weakly convergent light flux.

The first and second cylindrical lenses 1003 and 1203 have a finite power (refractive power) in the sub-scanning cross section, and condense the light fluxes LA and LB that have passed through the first and second collimating lenses 1002 and 1202 in the sub-scanning direction, respectively.

The first and second aperture stops 1004 and 1204 limit diameters of the light fluxes LA and LB that have passed through the first and second cylindrical lenses 1003 and 1203, respectively.

In this way, the light fluxes LA and LB emitted from the first and second light sources 1001 and 1201 are condensed only in the sub-scanning direction in the vicinity of the deflecting unit 11, and are imaged as a line image elongated in the main scanning direction.

The deflecting unit 11 deflects the light fluxes LA and LB incident on the deflecting unit 11 by being rotated in a direction indicated by an arrow A in FIG. 1A by a driving unit such as a motor (not shown). The deflecting unit 11 is formed by a polygon mirror, for example.

The first fθ lens 1006 and the second fθ lens 1007 are anamorphic imaging lenses having different powers between the main scanning cross section and in the sub-scanning cross section. The first fθ lens 1006 and the second fθ lens 1007 condense (guide) the light flux LA deflected by the deflecting unit 11 onto the first scanned surface 1008.

The first fθ lens 1206 and the second fθ lens 1207 are anamorphic imaging lenses having different powers between the main scanning cross section and in the sub-scanning cross section. The first fθ lens 1206 and the second fθ lens 1207 condense (guide) the light flux LB deflected by the deflecting unit 11 onto the second scanned surface 1208.

At this time, since the deflecting unit 11 rotates in the direction indicated by an arrow A in FIG. 1A, the deflected light fluxes LA and LB scan the first and second scanned surfaces 1008 and 1208 in a direction indicated by an arrow B in FIG. 1A, respectively.

In the light scanning apparatus 10 according to the one embodiment of the present invention, the first collimating lens 1002, the first cylindrical lens 1003 and the first aperture stop 1004 form a first incident optical system 75a. The second collimating lens 1202, the second cylindrical lens 1203 and the second aperture stop 1204 form a second incident optical system 75b.

In the light scanning apparatus 10, the first fθ lens 1006 and the second fθ lens 1007 form a first scanning optical system 85a. The first fθ lens 1206 and the second fθ lens 1207 form a second scanning optical system 85b.

In the light scanning apparatus 10, optical axes of the first and second incident optical systems 75a and 75b form angles of +3.0° and −3.0° with respect to the main scanning cross section in the sub-scanning cross section, respectively.

In the one embodiment of the present invention, the first and second photosensitive drums 1008 and 1208 are used as the first and second scanned surfaces 1008 and 1208.

The exposure distributions in the sub-scanning direction on the first and second photosensitive drums 1008 and 1208 are formed by rotating the first and second photosensitive drums 1008 and 1208 in the sub-scanning direction for each main scanning exposure.

Mirror members (not shown) for folding optical paths are provided between the deflecting unit 11 and the fθ lenses provided in the first and second scanning optical systems 85a and 85b.

Hereinafter, in order to simplify the discussion, the description will be made using only the developed optical paths, and the description of the mirror members will be omitted.

Next, various characteristics of the first incident optical system 75a and the first scanning optical system 85a in the light scanning apparatus 10 according to the one embodiment of the present invention are shown in Table 1 and Table 2 below, respectively.

Note that the second incident optical system 75b and the second scanning optical system 85b only needs to change signs of Z coordinate and elevation angle with respect to the first incident optical system 75a and the first scanning optical system 85a, respectively, so that they will be omitted in Tables 1 and 2, and the following description thereof.

TABLE 1

| Characteristics of first light source 1001 | | | |
|---|---|---|---|
| Wavelength | | λ(nm) | 790 |
| Incident polarization into deflecting surface of deflecting unit 11 | | | p-polarized light |
| Shape of stop | | | |
| | | Main scanning direction | Sub-scanning direction |
| First aperture stop 1004 | | 3.050 | 0.782 |
| Refractive Index | | | |
| First collimating lens 1002 | N1 | | 1.762 |

TABLE 1-continued

| | | | |
|---|---|---|---|
| First cylindrical lens 1003 | N2 | 1.524 | |

| Shape of optical elements | | | |
|---|---|---|---|
| | | Main scanning direction | Sub-scanning direction |
| Curvature radius of incident surface of first collimating lens 1002 | r1a (mm) | ∞ | ∞ |
| Curvature radius of exit surface of first collimating lens 1002 | r1b (mm) | −15.216 | −15.216 |
| Curvature radius of incident surface of first cylindrical lens 1003 | r2a (mm) | ∞ | −41.280 |
| Curvature radius of exit surface of first cylindrical lens 1003 | r2b (mm) | ∞ | ∞ |

| Placement | | |
|---|---|---|
| Distance between first light source 1001 and incident surface of first collimating lens 1002 | d0 (mm) | 18.31 |
| Distance between incident surface of first collimating lens 1002 and exit surface of first collimating lens 1002 | d1 (mm) | 3.00 |
| Distance between exit surface of first collimating lens 1002 and incident surface of first cylindrical lens 1003 | d2 (mm) | 16.00 |
| Distance between incident surface of first cylindrical lens 1003 and exit surface of first cylindrical lens 1003 | d3 (mm) | 7.00 |
| Distance between exit surface of first cylindrical lens 1003 and first aperture stop 1004 | d4 (mm) | 36.61 |
| Distance between first aperture stop 1004 and deflection reference point G0 | d5 (mm) | 40.33 |
| Incident angle in main scanning cross section of exit light from first aperture stop 1004 on deflecting unit 11 | A1 (deg) | 90.00 |
| Incident angle in sub-scanning cross section of exit light from first aperture stop 1004 on deflecting unit 11 | A3 (deg) | 3.00 |

TABLE 2

| fθ-factor, Scanning width, Maximum angle of view | | |
|---|---|---|
| fθ-factor | K(mm/rad) | 146 |
| Scanning width | W0(mm) | 230 |
| Maximum angle of view | θ(deg) | 45.1 |

| Refractive Index | | |
|---|---|---|
| Refractive index of first fθ lens 1006 | N1006 | 1.528 |
| Refractive index of second fθ lens 1007 | N1007 | 1.528 |

| Deflecting unit 11 | | |
|---|---|---|
| Number of deflecting surfaces | | 4 |
| Radius of circumscribed circle | Rpol(mm) | 10 |
| Distance between rotation center and deflection reference point G0 (optical axis direction) | Xpol(mm) | 5.74 |
| Distance between rotation center and deflection reference point G0 (main scanning direction) | Ypol(mm) | −4.26 |

| Scanning optical system 85a | | |
|---|---|---|
| Distance between deflection reference point G0 and incident surface of first fθ lens 1006 | d12 (mm) | 17.00 |
| Distance between incident surface of first fθ lens 1006 and exit surface of first fθ lens 1006 | d13 (mm) | 6.70 |
| Distance between exit surface of first fθ lens 1006 and incident surface of second fθ lens 1007 | d14 (mm) | 72.30 |
| Distance between incident surface of second fθ lens 1007 and exit surface of second fθ lens 1007 | d15 (mm) | 3.50 |
| Distance between exit surface of second fθ lens 1007 and scanned surface 1008 | d16 (mm) | 68.50 |
| Distance between deflection reference point G0 and incident surface of second fθ lens 1007 | L1(mm) | 96.00 |
| Distance between deflection reference point G0 and scanned surface 1008 | T1(mm) | 168.00 |
| Sub-scanning eccentricity of second fθ lens 1007 | shiftZ(mm) | −6.86 |
| Sub-scanning magnification of scanning optical system 85a | β | 1.02 |

| Meridional line shape of first fθ lens 1006 | | |
|---|---|---|
| | Incident surface | Exit surface |
| | Opposite light source side | Opposite light source side |
| R | −51.137 | −30.538 |
| ku | 3.782E+00 | −3.368E+00 |
| B4u | 7.252E−06 | −1.090E−05 |
| B6u | 1.546E−08 | 1.615E−08 |
| B8u | −6.679E−11 | −2.346E−11 |
| B10u | 8.958E−14 | −7.706E−15 |
| B12u | 0 | 0 |
| | Light source side | Light source side |
| kl | 3.782E+00 | −3.368E+00 |
| B4l | 7.252E−06 | −1.101E−05 |
| B6l | 1.546E−08 | 1.662E−08 |
| B8l | −6.679E−11 | −2.468E−11 |
| B10l | 8.958E−14 | −6.273E−15 |
| B12l | 0 | 0 |

| Sagittal line shape of first fθ lens 1006 | | |
|---|---|---|
| | Incident surface | Exit surface |
| | Sagittal line curvature | Sagittal line curvature |
| r | −17.000 | −14.556 |
| E1 | −3.162E−04 | −2.108E−04 |
| E2 | 1.606E−04 | 1.469E−05 |
| E3 | 4.325E−06 | 8.589E−07 |
| E4 | −2.605E−07 | 1.152E−08 |
| E5 | −1.750E−08 | −3.625E−10 |
| E6 | 4.818E−10 | −1.519E−11 |
| E7 | 3.559E−11 | −6.153E−16 |
| E8 | −8.704E−13 | 5.904E−15 |
| E9 | −3.851E−14 | 0 |
| E10 | 9.436E−16 | 0 |

TABLE 2-continued

| | | |
|---|---|---|
| E11 | 1.775E−17 | 0 |
| E12 | −4.248E−19 | 0 |

| | Sagittal line tilt | Sagittal line tilt |
|---|---|---|
| M0_1 | 2.000E−01 | 2.618E−01 |
| M1_1 | −2.289E−04 | −3.225E−04 |
| M2_1 | −1.857E−04 | −3.739E−05 |
| M3_1 | 1.718E−06 | 1.738E−06 |
| M4_1 | 5.937E−08 | −9.150E−08 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

Meridional line shape of second fθ lens 1007

| | Incident surface Opposite light source side | Exit surface Opposite light source side |
|---|---|---|
| R | −10000 | 281.813 |
| ku | 0 | −5.485E+01 |
| B4u | 0 | −3.264E−07 |
| B6u | 0 | 4.228E−11 |
| B8u | 0 | −4.867E−15 |
| B10u | 0 | 3.418E−19 |
| B12u | 0 | −1.028E−23 |

| | Light source side | Light source side |
|---|---|---|
| kl | 0 | −5.485E+01 |
| B4l | 0 | −3.279E−07 |
| B6l | 0 | 4.348E−11 |
| B8l | 0 | −5.180E−15 |
| B10l | 0 | 3.783E−19 |
| B12l | 0 | −1.200E−23 |

| | Incident surface Sagittal line curvature | Exit surface Sagittal line curvature |
|---|---|---|
| r | 23.575 | −1000.000 |
| E1 | −6.682E−06 | 0 |
| E2 | −3.384E−06 | 0 |
| E3 | 1.056E−09 | 0 |
| E4 | 4.503E−10 | 0 |
| E5 | −1.716E−13 | 0 |
| E6 | −4.863E−14 | 0 |
| E7 | 1.958E−17 | 0 |
| E8 | 4.936E−18 | 0 |
| E9 | −1.491E−21 | 0 |
| E10 | −3.223E−22 | 0 |
| E11 | 4.792E−26 | 0 |
| E12 | 1.057E−26 | 0 |

| | Sagittal line tilt | Sagittal line tilt |
|---|---|---|
| M0_1 | 1.965E−01 | −2.068E−02 |
| M1_1 | 0.000E+00 | 3.046E−05 |
| M2_1 | −8.809E−06 | 1.337E−05 |
| M3_1 | 0.000E+00 | −6.382E−09 |
| M4_1 | 2.512E−09 | −9.477E−10 |
| M5_1 | 0.000E+00 | 5.054E−14 |
| M6_1 | −2.908E−14 | 3.828E−13 |
| M7_1 | 0.000E+00 | 1.696E−16 |
| M8_1 | −1.548E−16 | −1.056E−16 |
| M9_1 | 0.000E+00 | −1.463E−20 |
| M10_1 | 3.590E−21 | −6.188E−21 |
| M11_1 | 0 | 0 |
| M12_1 | 0 | 0 |

In Tables 1 and 2, an intersection point G0 (hereinafter referred to as a deflection reference point G0) between an on-axis light flux LAon and the deflecting unit 11 is defined as an origin, the main scanning direction is defined as a Y-axis, the sub-scanning direction is defined as a Z-axis, and a direction perpendicular to the Y-axis and the Z-axis is defined as an X-axis.

Further, in Table 2, "E-x" means "×10$^{-x}$".

In the light scanning apparatus 10 according to the one embodiment of the present invention, an aspherical surface shape (a meridional line shape) in the main scanning cross section of each optical surface of the first fθ lens 1006 and the second fθ lens 1007 is represented by the following expression (1):

$$X = \frac{\frac{Y^2}{R}}{1 + \sqrt{1 - (1+k)\left(\frac{Y}{R}\right)^2}} + \sum_{i=4}^{12} B_i Y^i. \quad (1)$$

In the expression (1), R represents a curvature radius, k represents an eccentricity, and Bi (i=4, 6, 8, 10, 12) represents an aspherical coefficient.

When the coefficient Bi is different between a positive side and a negative side with respect to Y, a subscript u is added to it on the positive side (namely, Biu), and a subscript l is added to it on the negative side (namely, Bil), as shown in Table 2.

Further, the aspherical surface shape (a sagittal line shape) in the sub-scanning cross section of each optical surface of the first fθ lens 1006 and the second fθ lens 1007 is expressed by the following expression (2):

$$X = \frac{\frac{Z^2}{r'}}{1 + \sqrt{1 - \left(\frac{Z}{r'}\right)^2}} + \sum_{j=0}^{12} \sum_{k=1}^{1} M_{jk} Y^j Z^k. \quad (2)$$

In the expression (2), Mjk (j=0 to 12, and k=1) represents an aspherical coefficient.

Note that a sagittal line tilt (a sagittal line tilt amount) in the present invention indicates an M01. Accordingly, a sagittal line tilt surface indicates a surface in which the M01 is not 0, and a sagittal line tilt variation surface indicates a surface in which at least one of the Mj1 (j=1 to 12) is not 0.

Furthermore, a curvature radius r' in the sub-scanning cross section of each optical surface of the first fθ lens 1006 and the second fθ lens 1007 continuously varies in accordance with the Y coordinate as expressed by the following expression (3):

$$r' = \frac{1}{\frac{1}{r} + \sum_{j=1}^{12} E_j Y^j}. \quad (3)$$

In the expression (3), r represents the curvature radius on the optical axis, and Ej (j=1 to 12) represents a variation coefficient. Hereinafter, a reciprocal 1/r' of the curvature radius in the sub-scanning cross section is referred to as a sagittal line curvature.

Next, features of the light scanning apparatus 10 according to the one embodiment of the present invention and effects thereof are described.

First, in order to explain the features of the light scanning apparatus 10, a comparative example having the same structure as the light scanning apparatus 10 except that a first fθ lens 5006 and a second fθ lens 5007 are provided instead of the first fθ lens 1006 and the second fθ lens 1007 is described.

Specifically, in the first fθ lens 5006 and the second fθ lens 5007 provided in the comparative example, shapes of image effective portions (effective portions) on the incident surface and the exit surface are the same, whereas the other shapes are different, as compared to the first fθ lens 1006 and the second fθ lens 1007 provided in the light scanning apparatus 10.

The image effective portions of the first fθ lenses 1006 and 5006, and the second fθ lenses 1007 and 5007 are regions on which the light flux deflected by the deflecting unit 11 toward an image effective region (an effective region) between outermost off-axis image heights on both sides in the main scanning direction of the first scanned surface 1008 is incident.

Figure 2A:
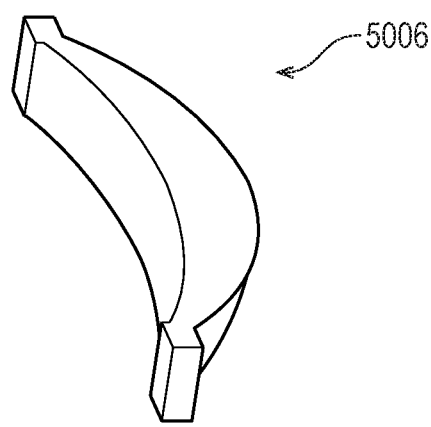
FIG. 2A is a perspective view of a first fθ lens in a comparative example.
Figure 2B:
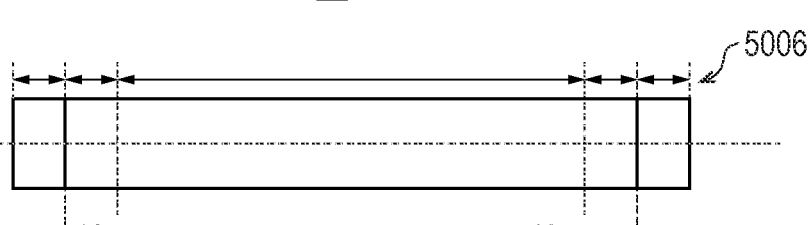
FIG. 2B is a projected view in the YZ cross section of an incident surface of the first fθ lens in the comparative example.
Figure 2C:
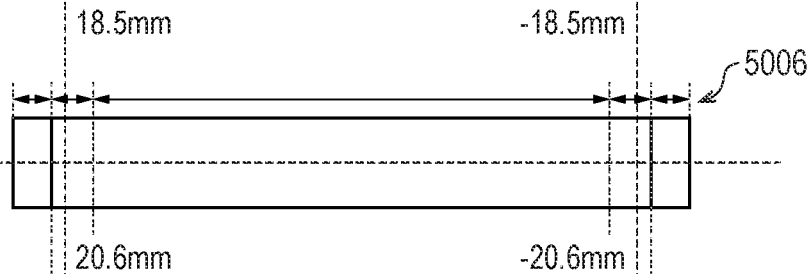
FIG. 2C is a projected view in the YZ cross section of an exit surface of the first fθ lens in the comparative example.

FIGS. 2A, 2B and 2C show a perspective view, a projected view in the YZ cross section of the incident surface, and a projected view in the YZ cross section of the exit surface, of the first fθ lens 5006 provided in the comparative example, respectively.

Figure 2D:
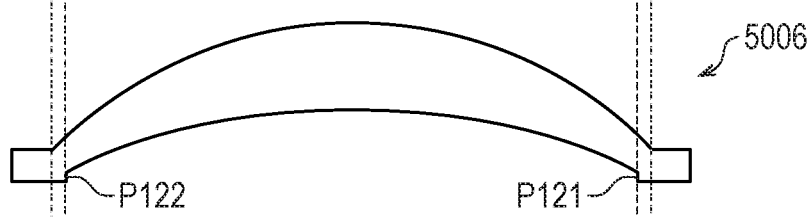
FIG. 2D is a main scanning cross sectional view of the first fθ lens at a position of Z=+3.4 mm in the comparative example.
Figure 2E:
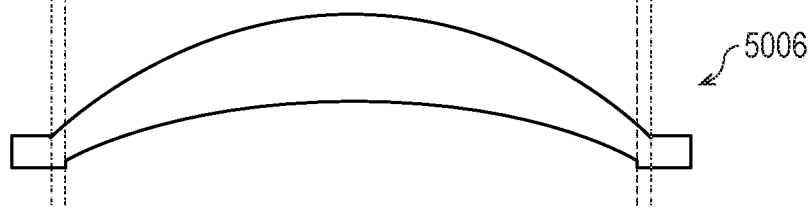
FIG. 2E is a main scanning cross sectional view of the first fθ lens at a position of Z=0 mm in the comparative example.
Figure 2F:
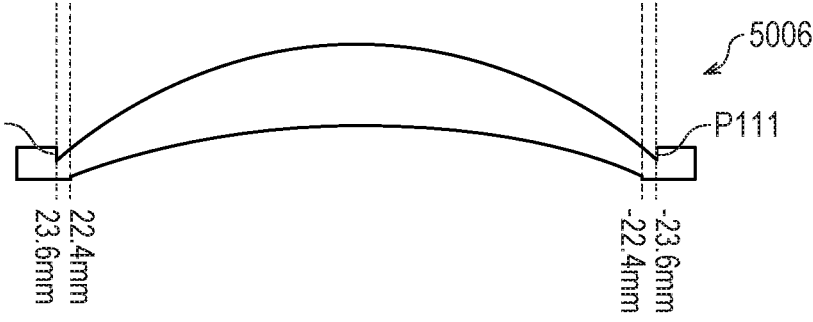
FIG. 2F is a main scanning cross sectional view of the first fθ lens at a position of Z=−3.4 mm in the comparative example.

Further, FIGS. 2D, 2E and 2F show main scanning cross sectional views of the first fθ lens 5006 provided in the comparative example at positions of Z=+3.4 mm, Z=0 mm and Z=−3.4 mm, respectively.

Figure 3A:
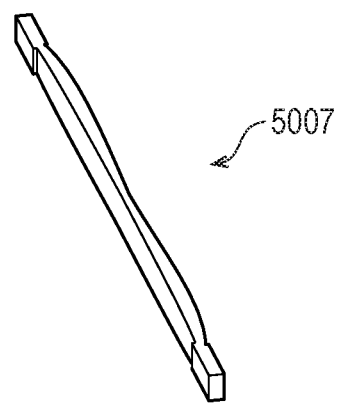
FIG. 3A is a perspective view of a second fθ lens in the comparative example.
Figure 3B:
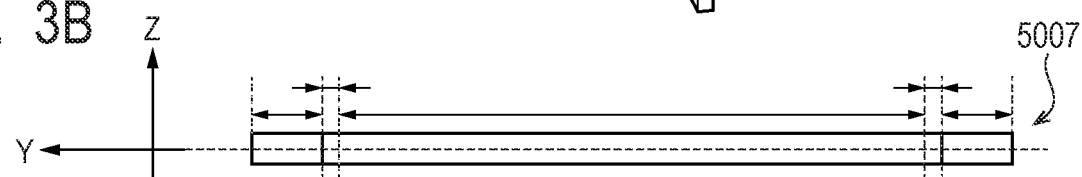
FIG. 3B is a projected view in the YZ cross section of an incident surface of the second fθ lens in the comparative example.
Figure 3C:
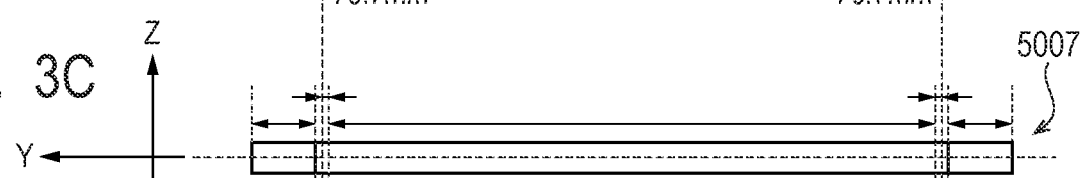
FIG. 3C is a projected view in the YZ cross section of an exit surface of the second fθ lens in the comparative example.

Furthermore, FIGS. 3A, 3B and 3C show a perspective view, a projected view in the YZ cross section of the incident surface, and a projected view in the YZ cross section of the exit surface, of the second fθ lens 5007 provided in the comparative example, respectively.

Figure 3D:
FIG. 3D is a main scanning cross sectional view of the second fθ lens at a position of Z=+3.8 mm in the comparative example.
Figure 3E:
FIG. 3E is a main scanning cross sectional view of the second fθ lens at a position of Z=0 mm in the comparative example.
Figure 3F:
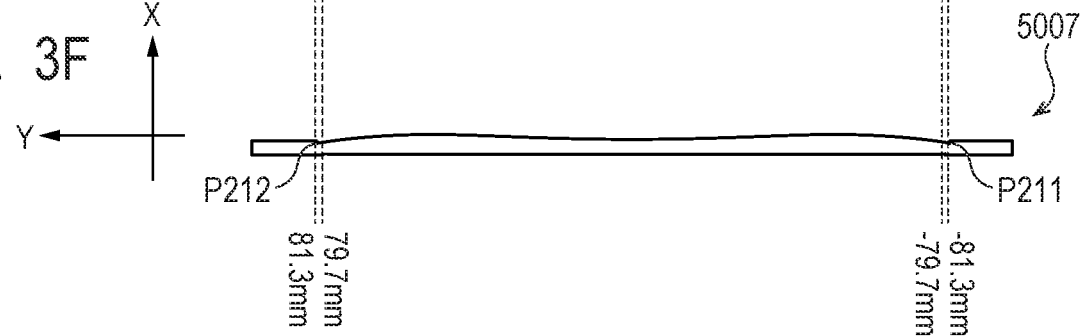
FIG. 3F is a main scanning cross sectional view of the second fθ lens at a position of Z=−3.8 mm in the comparative example.

In addition, FIGS. 3D, 3E and 3F show main scanning cross sectional views of the second fθ lens 5007 provided in the comparative example at the positions of Z=+3.8 mm, Z=0 mm and Z=−3.8 mm, respectively.

Table 3 shows formation ranges of the image effective portion, the image non-effective portion (a non-effective portion) and the outer portion (a frame portion, a guard portion and a holded portion) on the incident surface and the exit surface of the first and second fθ lenses 5006 and 5007 provided in the comparative example by numerical values.

TABLE 3

| | | Main scanning direction (mm) | | | | | Sub-scanning direction (mm) | | |
|---|---|---|---|---|---|---|---|---|---|
| | | Outer portion | Image non-effective portion | Image effective portion | Image non-effective portion | Outer portion | Image non-effective portion | Image effective portion | Image non-effective portion |
| First fθ lens 5006 | Incident surface | −26.5- −22.4 | −22.4- −18.5 | −18.5- 18.5 | 18.5- 22.4 | 22.4- 26.5 | −3.4- −2.2 | −2.2- 2.2 | 2.2- 3.4 |
| | Exit surface | −26.5- −23.6 | −23.6- −20.6 | −20.6- 20.6 | 20.6- 23.6 | 23.6- 26.5 | −3.4- −2.2 | −2.2- 2.2 | 2.2- 3.4 |
| Second fθ lens 5007 | Incident surface | −97.5- −79.7 | −79.7- −76.7 | −76.7- 76.7 | 76.7- 79.7 | 79.7- 97.5 | −3.8- −2.7 | −2.7- 2.7 | 2.7- 3.8 |
| | Exit | −97.5- −81.3 | −81.3- −78.3 | −78.3- 78.3 | 78.3- 81.3 | | −3.8- −2.7 | −2.7- | 2.7- |

TABLE 3-continued

|  | Main scanning direction (mm) | | | | Sub-scanning direction (mm) | | |
| --- | --- | --- | --- | --- | --- | --- | --- |
|  | Outer portion | Image non-effective portion | Image effective portion | Image non-effective portion | Outer portion | Image non-effective portion | Image effective portion | Image non-effective portion |
| surface | −81.3 | −78.3 | 78.3 | 81.3 | 97.5 | −2.7 | 2.7 | 3.8 |

As shown in Table 3, the image effective portion, the image non-effective portion and the outer portion are formed in this order from a center toward both ends in the main scanning direction on the incident surface and the exit surface of the first and second fθ lenses 5006 and 5007.

Further, as shown in Table 3, the image effective portion and the image non-effective portion are formed in this order from the center toward both ends of the image effective portion also in the sub-scanning direction on the incident surface and the exit surface of the first and second fθ lenses 5006 and 5007.

The image effective portion and the image non-effective portion on the incident surface and the exit surface of the first and second fθ lenses 5006 and 5007 are optical mirror surface portions (mirror surface portions), and are molded by using a single mold piece (hereinafter, referred to as an optical mirror surface piece).

On the other hand, the outer portion of the incident surface and the exit surface of the first and second fθ lenses 5006 and 5007 are molded by using a hollow single mold piece (a frame-shaped piece) formed so as to accommodate and surround the optical mirror surface piece, or mold pieces (hereinafter referred to as outer pieces) provided one by one on both sides of the optical mirror surface piece.

In addition, a side surface of the first and second fθ lenses 5006 and 5007 are molded by using a side surface piece.

Further, as shown in FIGS. 2D to 2F and FIGS. 3D to 3F, the shapes of the first and second fθ lenses 5006 and 5007 in the main scanning cross section at respective positions in the sub-scanning direction are different from each other in accordance with the sagittal line tilt and the sagittal line curvature.

In particular, a change in thickness in accordance with the position in the sub-scanning direction of the first and second fθ lenses 5006 and 5007 is large in the vicinities of the connecting portions P111, P112, P121, P122, P211, P212, P221 and P222 between the image non-effective portion and the outer portion on the incident surface and the exit surface of the first and second fθ lenses 5006 and 5007.

When there is such large change in thickness in the first and second fθ lenses 5006 and 5007, a difference in cooling occurs in accordance with the position in the sub-scanning direction during molding them.

As a result, a surface deformation such as warpage that affects the shape of the image effective portion may occur when the mold is released from them or they shrink, or a birefringence that is large enough to affect an optical performance of the image effective portion may occur due to a change in a flow path of a resin in accordance with the unevenness of the thickness described above, which is not preferable.

In other words, the outer portion is provided on an outer side of the image non-effective portion in order to suppress the above-described large change in thickness from progressing to the ends in the main scanning direction and further increasing, on the incident surface and the exit surface of the first and second fθ lenses 5006 and 5007.

This is one of the reasons why the outer portion is provided in the first and second fθ lenses 5006 and 5007 provided in the comparative example.

On the other hand, a step due to the large change in thickness is formed in the vicinity of the connecting portions P111 to P222 between the image non-effective portion and the outer portion by providing the outer portion on the incident surface and the exit surface of the first and second fθ lenses 5006 and 5007.

Then, it is not preferable that the surface deformation occurs at the mold release or the shrinkage in accordance with a cooling difference at the step during molding, or an increase in birefringence occurs due to the change in the flow path of the resin.

Accordingly, in the light scanning apparatus 10 according to the one embodiment of the present invention, the sagittal line tilt and the sagittal line curvature are adjusted by forming at least a part of the image non-effective portion in a spline shape on the incident surface and the exit surface of the first and second fθ lenses 1006 and 1007 in view of the above-described problem.

Thereby, it is possible to suppress the surface deformation which occurs when the mold is released from them or they shrink in molding, or the increase in birefringence which may occur due to a change in the flow path of the resin by suppressing a change in the shape (particularly, the thickness) in the main scanning cross section in accordance with the position in the sub-scanning direction of the first and second fθ lenses 1006 and 1007.

On the other hand, the image effective portion on each of the incident surface and the exit surface of the first and second fθ lenses 1006 and 1007 can be formed into a shape with which a good optical performance can be obtained.

Figure 4A:
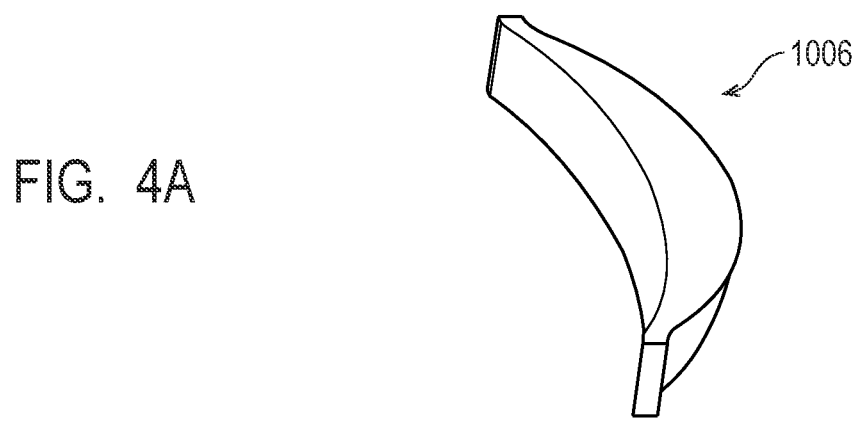
FIG. 4A is a perspective view of a first fθ lens in the one embodiment of the present invention.
Figure 4B:
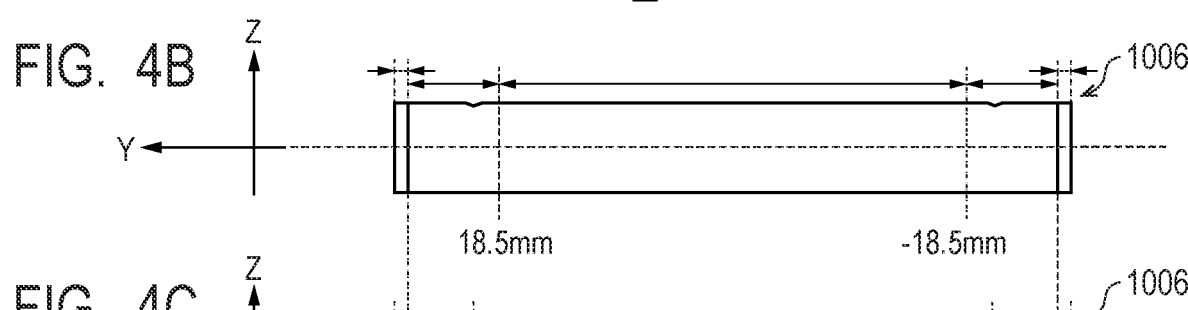
FIG. 4B is a projected view in the YZ cross section of an incident surface of the first fθ lens in the one embodiment of the present invention.
Figure 4C:
FIG. 4C is a projected view in the YZ cross section of an exit surface of the first fθ lens in the one embodiment of the present invention.

FIGS. 4A, 4B and 4C show a perspective view, a projected view in the YZ cross section of the incident surface, and a projected view in the YZ cross section of the exit surface, of the first fθ lens 1006 provided in the light scanning apparatus 10 according to the one embodiment of the present invention, respectively.

Figure 4D:
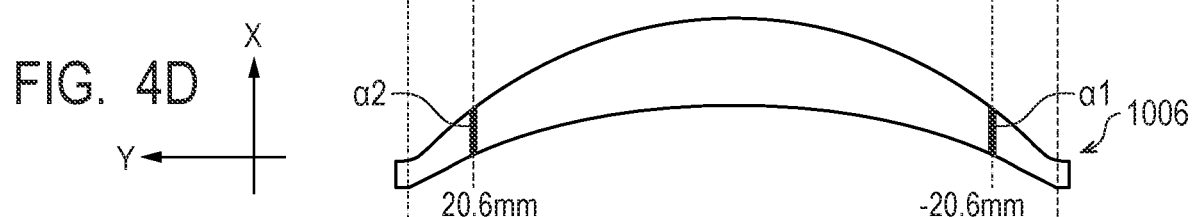
FIG. 4D is a main scanning cross sectional view of the first fθ lens at a position of Z=+3.4 mm in the one embodiment of the present invention.
Figure 4E:
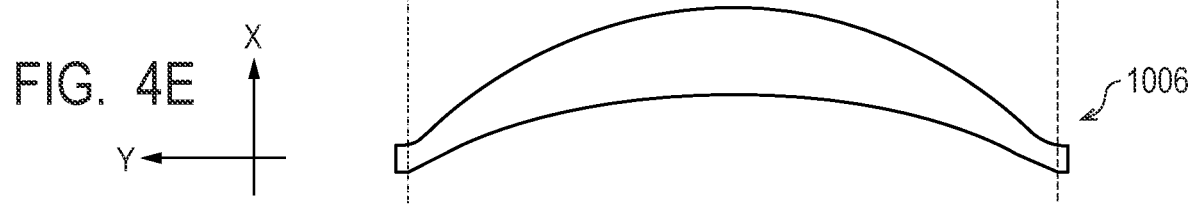
FIG. 4E is a main scanning cross sectional view of the first fθ lens at a position of Z=0 mm in the one embodiment of the present invention.
Figure 4F:
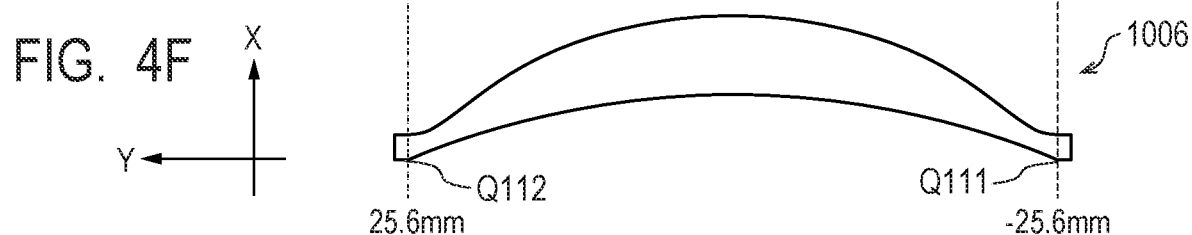
FIG. 4F is a main scanning cross sectional view of the first fθ lens at a position of Z=−3.4 mm in the one embodiment of the present invention.

Further, FIGS. 4D, 4E and 4F show main scanning cross sectional views of the first fθ lens 1006 provided in the light scanning apparatus 10 at positions of Z=+3.4 mm, Z=0 mm and Z=−3.4 mm, respectively.

Note that marks α1 and α2 formed on the first fθ lens 1006 are shown only in FIGS. 4B, 4C and 4D, and are omitted in FIG. 4A, as explained below.

Figure 5A:
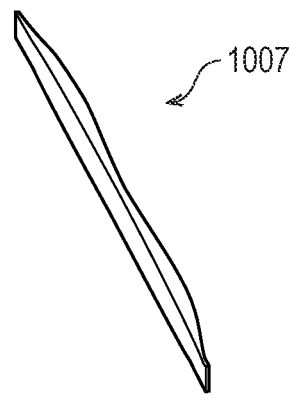
FIG. 5A is a perspective view of a second fθ lens in the one embodiment of the present invention.
Figure 5B:
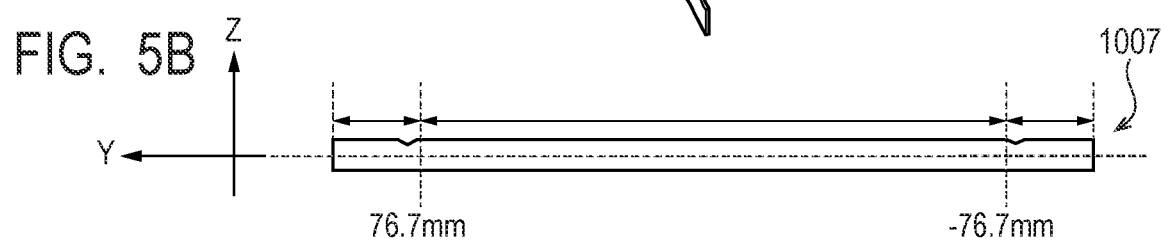
FIG. 5B is a projected view in the YZ cross section of an incident surface of the second fθ lens in the one embodiment of the present invention.
Figure 5C:
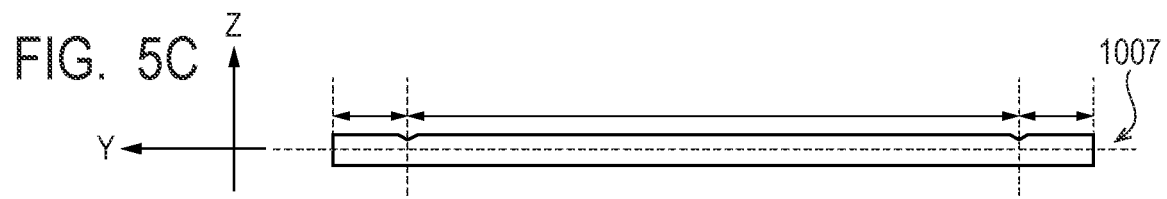
FIG. 5C is a projected view in the YZ cross section of an exit surface of the second fθ lens in the one embodiment of the present invention.

Furthermore, FIGS. 5A, 5B and 5C show a perspective view, a projected view in the YZ cross section of the incident surface, and a projected view in the YZ cross section of the exit surface, of the second fθ lens 1007 provided in the light scanning apparatus 10, respectively.

Figure 5D:
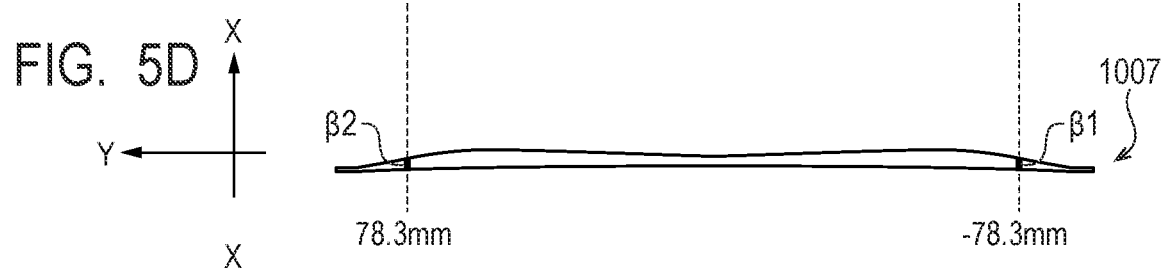
FIG. 5D is a main scanning cross sectional view of the second fθ lens at a position of Z=+3.8 mm in the one embodiment of the present invention.
Figure 5E:
FIG. 5E is a main scanning cross sectional view of the second fθ lens at a position of Z=0 mm in the one embodiment of the present invention.
Figure 5F:
FIG. 5F is a main scanning cross sectional view of the second fθ lens at a position of Z=−3.8 mm of the second fθ lens in the one embodiment of the present invention.

In addition, FIGS. 5D, 5E and 5F show main scanning cross sectional views of the second fθ lens 1007 provided in the light scanning apparatus 10 at positions of Z=+3.8 mm, Z=0 mm and Z=−3.8 mm, respectively.

Note that marks β1 and β2 formed on the second fθ lens 1007 are shown only in FIGS. 5B, 5C and 5D, and are omitted in FIG. 5A, as explained below.

Table 4 shows formation ranges of the image effective portion, the image non-effective portion and the outer portion on the incident surface and the exit surface of the first and second fθ lenses 1006 and 1007 provided in the light scanning apparatus 10 by numerical values.

sub-scanning direction are different from each other in accordance with the sagittal line tilt and the sagittal line curvature.

On the other hand, the change in the thickness of the first fθ lens 1006 in accordance with the position in the sub-scanning direction at the connecting portions Q111 and Q112 between the image non-effective portion and the outer

TABLE 4

|  |  | Main scanning direction (mm) | | | | | Sub-scanning direction (mm) | | |
| --- | --- | --- | --- | --- | --- | --- | --- | --- | --- |
|  |  | Outer portion | Image non-effective portion | Image effective portion | Image non-effective portion | Outer portion | Image non-effective portion | Image effective portion | Image non-effective portion |
| First fθ lens 1006 | Incident surface | −26.5-−25.6 | −25.6-−18.5 | −18.5-18.5 | 18.5-25.6 | 25.6-26.5 | −3.4-−2.2 | −2.2-2.2 | 2.2-3.4 |
|  | Exit surface | — | −26.5-−20.6 | −20.6-20.6 | 20.6-26.5 | — | −3.4-−2.2 | −2.2-2.2 | 2.2-3.4 |
| Second fθ lens 1007 | Incident surface | — | −97.5-−76.7 | −76.7-76.7 | 76.7-97.5 | — | −3.8-−2.7 | −2.7-2.7 | 2.7-3.8 |
|  | Exit surface | — | −97.5-−78.3 | −78.3-78.3 | 78.3-97.5 | — | −3.8-−2.7 | −2.7-2.7 | 2.7-3.8 |

As shown in Table 4, the image effective portion, the image non-effective portion and the outer portion are formed in this order from the center toward both ends in the main scanning direction on the incident surface of the first fθ lens 1006.

On the other hand, the image effective portion and the image non-effective portion are formed in this order from the center toward both ends in the main scanning direction on the exit surface of the first fθ lens 1006, and the incident surface and the exit surface of the second fθ lens 1007.

That is, unlike the first fθ lens 5006 and the second fθ lens 5007 provided in the comparative example, no outer portion is formed on the exit surface of the first fθ lens 1006, and the incident surface and the exit surface of the second fθ lens 1007 according to the one embodiment of the present invention.

This is because at least a part of the image non-effective portion of each of the exit surface of the first fθ lens 1006, and the incident surface and the exit surface of the second fθ lens 1007 according to the one embodiment of the present invention is formed in a spline shape.

Thereby, the sagittal line tilt and the sagittal line curvature on a side opposite to the image effective portion (hereinafter, referred to as an opposite image effective portion side) in the image non-effective portion of the exit surface of the first fθ lens 1006 and the incident surface and the exit surface of the second fθ lens 1007 can be adjusted to be close to zero.

Since the reason for providing the outer portion as described above is eliminated, it is possible to use a simple mold structure in which an outer shape piece is not necessary and an optical mirror surface piece and a side surface piece are adjacent to each other when the exit surface of the first fθ lens 1006 and the incident surface and the exit surface of the second fθ lens 1007 are molded.

Further, as shown in Table 4, the image effective portion and the image non-effective portion are formed in this order from the center to both ends of the image effective portion also in the sub-scanning direction on the incident surfaces and the exit surfaces of the first and second fθ lenses 1006 and 1007.

As shown in FIGS. 4D to 4F and FIGS. 5D to 5F, the shapes of the first and second fθ lenses 1006 and 1007 in the main scanning cross section at respective positions in the portion on the incident surface of the first fθ lens 1006 is smaller than that of the first fθ lens 5006.

Further, in the vicinity of the end at the opposite image effective portion side (a first end) of the image non-effective portion of the exit surface of the first fθ lens 1006 and the incident surface and the exit surface of the second fθ lens 1007 on the side opposite to the image effective portion, the change in the thickness of the first and second I'd lenses 1006 and 1007 in accordance with the position in the sub-scanning direction is smaller than that of the first and second fθ lenses 5006 and 5007.

This is also because at least a part of the image non-effective portion of each of the incident surface and the exit surface of the first and second fθ lenses 1006 and 1007 according to the one embodiment of the present invention is formed in a spline shape.

Thereby, when the first and second fθ lenses 1006 and 1007 are molded, it is possible to suppress the surface deformation such as warpage which affects the shape of the image effective portion when the mold is released from them or they shrink due to the cooling difference caused by the change in the thickness, and the birefringence which is large enough to affect the optical performance of the image effective area due to a change in the flow path of the resin caused by the unevenness in the thickness.

Further, unlike the first fθ lens 5006 provided in the comparative example, a step due to a large change in the thickness is not formed in the connecting portions Q111 and Q112 between the image non-effective portion and the outer portion on the incident surface of the first fθ lens 1006 according to the one embodiment of the present invention.

In other words, it is preferable that a tangential line at any position in the main scanning direction in the main scanning cross section including any position in the sub-scanning direction forms an angle of 45° or more with respect to the X direction (the thickness direction) parallel to the optical axis in a portion other than the image effective portion of each of the incident surface and the exit surface of the first and second fθ lenses 1006 and 1007 according to the one embodiment of the present invention.

Thereby, the above-described surface deformation and increase in birefringence can be further suppressed by suppressing a steep change in the thickness.

On the other hand, since the outer portion is not formed on the exit surface of the first fθ lens 1006 and the incident surface and the exit surface of the second fθ lens 1007 according to the one embodiment of the present invention, it is difficult to distinguish between the image effective portion and the image non-effective portion, so that it is difficult to visually recognize the image effective portion at the time of appearance inspection or the like, for example.

Accordingly, as shown in FIGS. 4B to 4D and FIGS. 5B to 5D, it is preferable to form marks (distinguishing portions) α1, α2, β1 and β2 which are grooves with a depth of about 0.05 mm, over an upper surface of the first and second fθ lenses 1006 and 1007 at a connecting portion between the image effective portion and the image non-effective portion on the exit surface of each of the first and second fθ lenses 1006 and 1007 according to the one embodiment of the present invention, namely at an end (a second end) on the image effective portion side of the image non-effective portion.

This makes it easy to distinguish between the image effective portion and the image non-effective portion in the first and second fθ lenses 1006 and 1007.

Here, the groove is formed at the connection portion between the image effective portion and the image non-effective portion in the exit surface in which a size of the image effective portion is larger than that in the incidence surface in the one embodiment of the present invention.

Further, since the above-described surface deformation or increase in birefringence may occur when the groove is formed in the image effective portion, it is preferable to form the groove in the image non-effective portion, for example, on the upper surface (a non-optical surface on the outer side in the sub-scanning direction).

A scattering surface or a protruding point may be formed instead of the groove described above as the mark (a discontinuous portion) for distinguishing between the image effective portion and the image non-effective portion.

Further, a shape of a guard portion may be changed when an outer portion in the sub-scanning direction, namely the guard portion is provided.

Furthermore, although the structure in which the mark for distinguishing the image effective portion is provided is described in the above description, the present invention is not limited thereto. The above-described structure can be applied to various purposes including a distinction of portions other than the image effective portion, such as a non-spline portion and a spline portion in the image non-effective portion described below.

Next, the spline shape formed in the image non-effective portion of each of the incident surface and the exit surface of the first and second fθ lenses 1006 and 1007 according to the one embodiment of the present invention is described in detail.

At least a part of the image non-effective portion, specifically a region on the opposite image effective portion side in the main scanning direction from a predetermined position (hereinafter, referred to as a connection point) in the image non-effective portion is formed in the spline shape on the incident surface and the exit surface of the first and second fθ lenses 1006 and 1007 according to the one embodiment of the present invention.

More specifically, regions shown in Table 5 below are formed in the spline shape in the incident surfaces and the exit surfaces of the first and second fθ lenses 1006 and 1007.

TABLE 5

| | | | | Main scanning direction (mm) | | | | | | | |
|---|---|---|---|---|---|---|---|---|---|---|---|
| | | | | | Image non-effective portion | | | | Image non-effective portion | | |
| | | | | | Spline portion | | | | Spline portion | | |
| | | | Outer Portion | Constant value region | Change value region | Non-spline portion | Image effective portion | Non-spline portion | Change value region | Constant value region | Outer Portion |
| First fθ lens 1006 | Incident surface | Meridional line shape | −26.5- −25.6 | — | −25.6- −18.5 | — | −18.5- 18.5 | — | 18.5- 25.6 | — | 25.6- 26.5 |
| | | Sagittal line Tilt | | −25.6- −25 | −25- −18.5 | — | | — | 18.5- 25 | 25- 25.6 | |
| | | Sagittal line curvature | | −25.6- −25 | −25- −18.5 | — | | — | 18.5- 25 | 25- 25.6 | |
| | Exit surface | Meridional line shape | — | — | −26.5- −20.6 | — | −20.6- 20.6 | — | 20.6- 26.5 | — | — |
| | | Sagittal line Tilt | | — | −26.5- −21.2 | −21.2- −20.6 | | 20.6- 21.2 | 21.2- 26.5 | — | |
| | | Sagittal line curvature | | — | −26.5- −21.2 | −21.2- −20.6 | | 20.6- 21.2 | 21.2- 26.5 | — | |
| Second fθ lens 1007 | Incident surface | Meridional line shape | — | −97.5- −95 | −95- −90 | −90- −76.7 | −76.7- 76.7 | 76.7- 90 | 90- 95 | 95- 97.5 | — |
| | | Sagittal line Tilt | | −97.5- −90 | −90- −76.7 | — | | — | 76.7- 90 | 90- 97.5 | |
| | | Sagittal line curvature | | −97.5- −90 | −90- −76.7 | — | | — | 76.7- 90 | 90- 97.5 | |
| | Exit surface | Meridional line shape | — | −97.5- −95 | −95- −90 | −90- −78.3 | −78.3- 78.3 | 78.3- 90 | 90- 95 | 95- 97.5 | — |
| | | Sagittal line Tilt | | −97.5- −90 | −90- −78.3 | — | | — | 78.3- 90 | 90- 97.5 | |
| | | Sagittal line curvature | | −97.5- −90 | −90- −78.3 | — | | — | 78.3- 90 | 90- 97.5 | |

Here, a portion formed in the spline shape is referred to as a spline portion, and the other portion is referred to as a non-spline portion in the image non-effective portion of the incident surface and the exit surface of the first and second fθ lenses 1006 and 1007.

Then, the sagittal line tilt and the sagittal line curvature in the spline portion are adjusted by forming the spline portion in the spline shape.

Further, the spline portion is provided with a region in which the meridional line shape, the sagittal line tilt and the sagittal line curvature change, and a region in which they are constant, which are hereinafter referred to as a change value region and a constant value region, respectively.

As shown in Table 5, the spline shape is set for each of the meridional line shape, the sagittal line tilt and the sagittal line curvature in the image non-effective portion of the incident surface and the exit surface of the first and second fθ lenses 1006 and 1007.

That is, the connection point between the spline portion and the non-spline portion, the change value region, and the constant value region are set in each of the spline shapes for the meridional line shape, the sagittal line tilt and the sagittal line curvature.

In the first and second fθ lenses 1006 and 1007, the spline shapes for the meridional line shape, the sagittal line tilt and the sagittal line curvature are set by a 12th-order polynomial function f(Y) of the position Y in the main scanning direction as expressed by the following expression (4):

$$f(Y) = \sum_{j=0}^{12} C_j Y^j. \tag{4}$$

In the expression (4), Cj (j=0 to 12) is a variation coefficient.

In at least one optical surface of at least one of the first and second fθ lenses 1006 and 1007, it is preferable to set the constant value region as described above in each of the spline shapes for the meridional line shape, the sagittal line tilt and the sagittal line curvature.

In other words, it is preferable that a position in the optical axis direction in the main scanning cross section including the optical axis, the sagittal line tilt and the sagittal line curvature do not change in the main scanning direction in a predetermined region in the spline portion of at least one optical surface of at least one of the first and second fθ lenses 1006 and 1007.

Thereby, a degree of freedom in changing each of the meridional line shape, the sagittal line tilt and the sagittal line curvature can be improved, and in particular a speed can be improved and a manufacturing error can be reduced in manufacturing the optical mirror surface piece.

As described above, the spline shape is set also for the meridional line shape in the incident surface and the exit surface of the first and second fθ lenses 1006 and 1007.

By setting the spline shape also for the meridional line shape, it is possible to appropriately set not only the change in thickness in accordance with the position in the sub-scanning direction, but also the thickness in the main scanning cross section including the optical axis, namely in accordance with the position in the main scanning direction.

Thereby, when the first and second fθ lenses 1006 and 1007 are molded, it is possible to further suppress the surface deformation which occurs when the mold is released from them or they shrink, and the increase in birefringence which may occur due to a change in the flow path of the resin.

Further, each of the spline shapes for the meridional line shape, the sagittal line tilt and the sagittal line curvature can be basically defined by an arbitrary function instead of the expression (4) described above in the incident surface and the exit surface of the first and second fθ lenses 1006 and 1007.

For example, the spline shape may be set using a function obtained by adding a predetermined function to a function defining the shape of the image effective portion, or it may be set using an independent function not depending on the function defining the shape of the image effective portion.

Furthermore, the spline shape can be defined using an arbitrary mathematical expression such as a trigonometric function or a polynomial function.

On the other hand, since the spline shape is defined by a function different from the function defining the shape of the image effective portion as described above, it should be noted that functions representing the incident surface and the exit surface of the first and second fθ lenses 1006 and 1007 are continuous at the connection point, whereas they are not infinitely differentiable.

Specifically, at least one of functions representing changes in the main scanning direction of the sagittal line tilt and the sagittal line curvature is continuous but not infinitely differentiable at the connection point (a predetermined position) in each of two image non-effective portions formed on opposite sides of the image effective portion in the main scanning direction, in at least one optical surface of at least one of the first and second fθ lenses 1006 and 1007.

If the function is infinitely differentiable at the connection point, the shape of the image non-effective portion can be defined by the function defining the shape of the image effective portion, so that it is not necessary to set the spline shape in the image non-effective portion.

Further, if the shape of the image non-effective portion is defined by the function defining the shape of the image effective portion, the function becomes complicated, for example a high-order term is required in the case of the polynomial function, so that a design and a work become difficult.

That is, the shape of the image effective portion can be defined by a simple function, and the image non-effective portion can be formed in a desired shape by setting the shape of at least a part of the image non-effective portion to be the spline shape on the incident surface and the exit surface of the first and second fθ lenses 1006 and 1007.

On the other hand, in order to reduce the change in the thickness and the unevenness of the flow path of the resin as described above, the shapes of the spline portion and the non-spline portion needs to be continuous with each other at the connection point on the incident surface and the exit surface of the first and second fθ lenses 1006 and 1007.

In other words, it is required to suppress a formation of a step between the spline portion and the non-spline portion at the connection point.

Figure 6A:
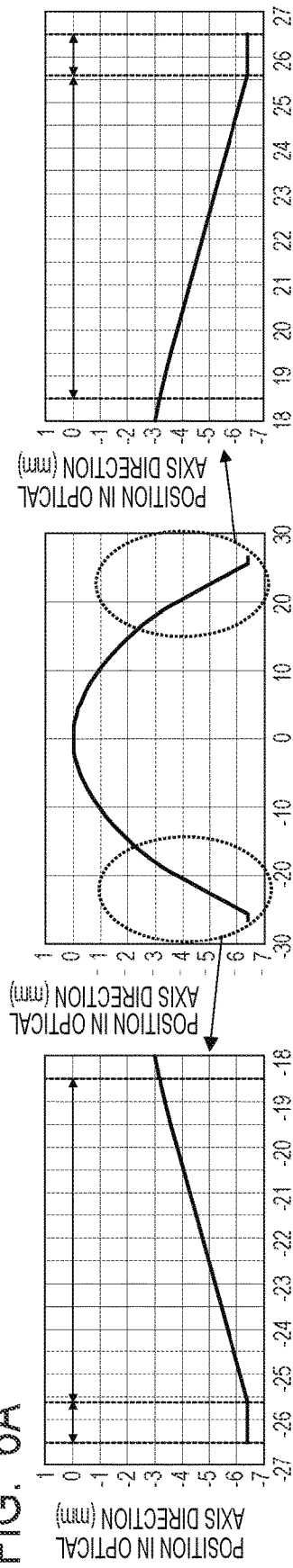
FIG. 6A is a graph showing a positional dependence in a main scanning direction of a meridional line shape of the incident surface of the first fθ lens in the one embodiment of the present invention.

FIG. 6A shows a positional dependence in the main scanning direction of a position in the optical axis direction in the main scanning cross section including the optical axis, namely the meridional line shape of the incident surface of the first fθ lens 1006 according to the one embodiment of the present invention.

Figure 6B:
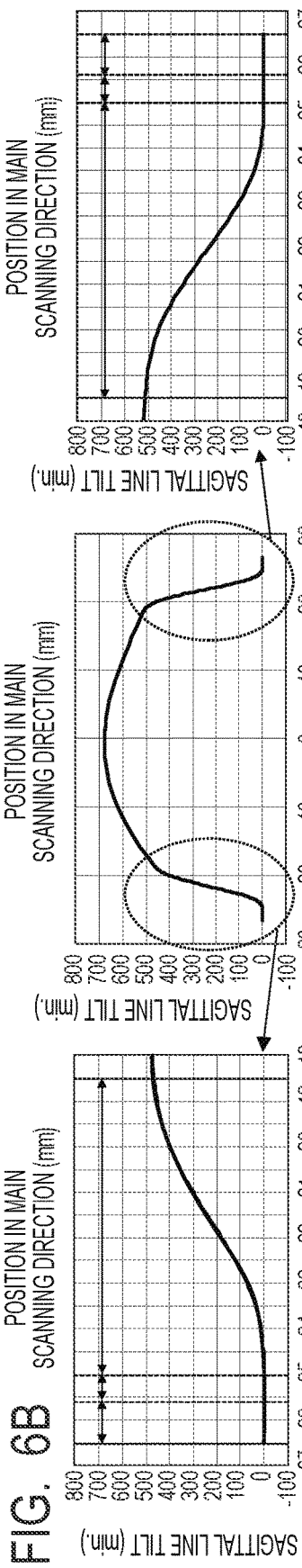
FIG. 6B is a graph showing a positional dependence in the main scanning direction of a sagittal line tilt of the incident surface of the first fθ lens in the one embodiment of the present invention.
Figure 6C:
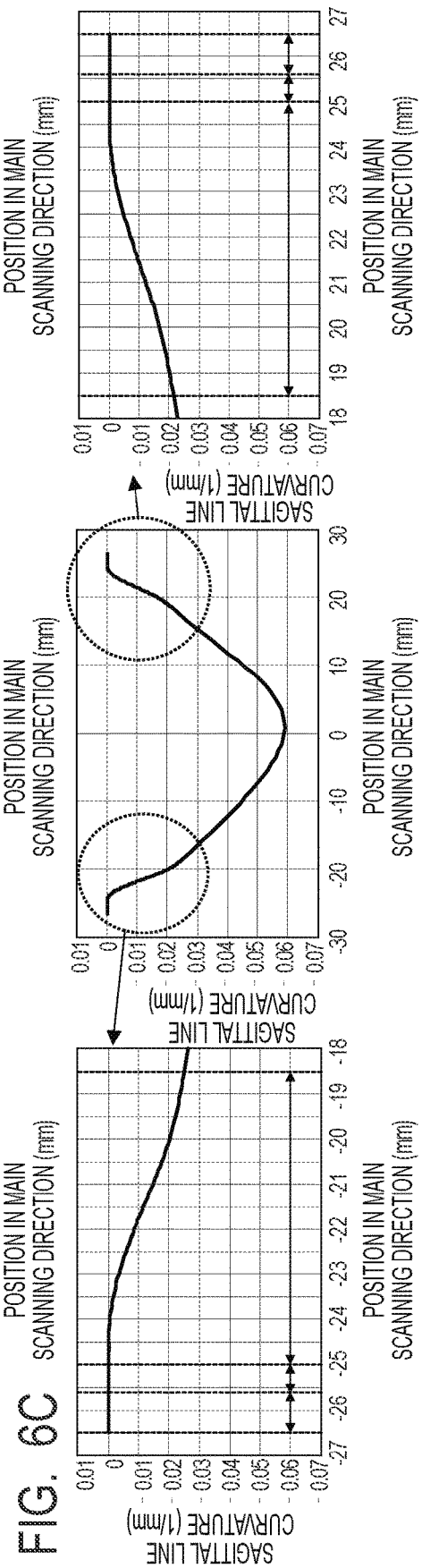
FIG. 6C is a graph showing a positional dependence in the main scanning direction of a sagittal line curvature of the incident surface of the first fθ lens in the one embodiment of the present invention.

FIGS. 6B and 6C show positional dependencies in the main scanning direction of the sagittal line tilt and the sagittal line curvature on the incident surface of the first fθ lens 1006, respectively.

Figure 7A:
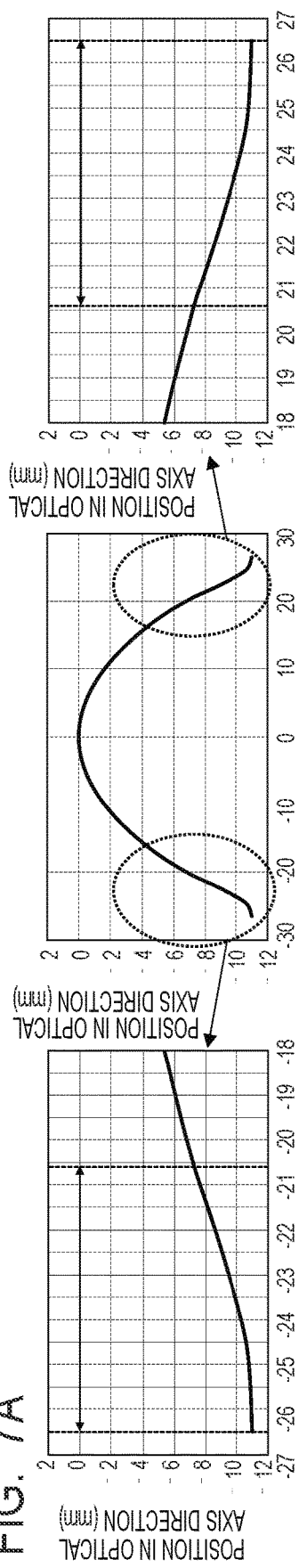
FIG. 7A is a graph showing a positional dependence in the main scanning direction of the meridional line shape of the exit surface of the first fθ lens in the one embodiment of the present invention.

FIG. 7A shows a meridional line shape on the exit surface of the first fθ lens 1006.

Figure 7B:
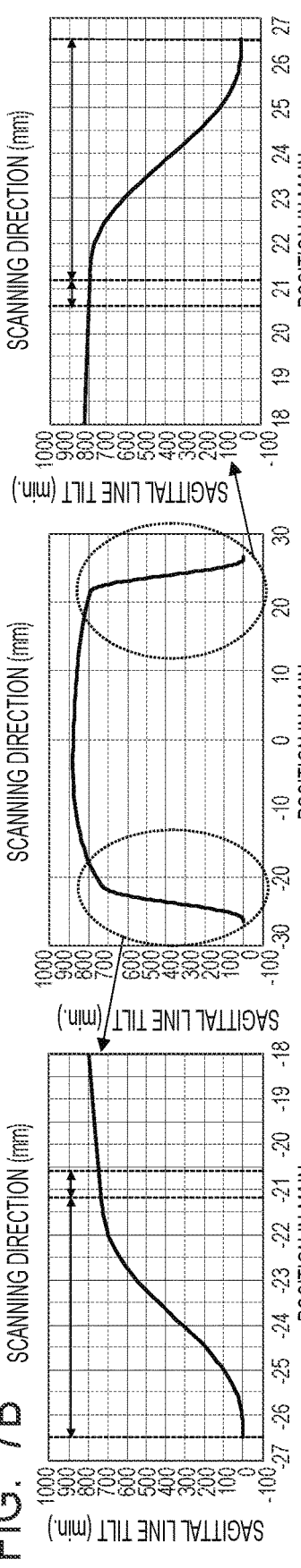
FIG. 7B is a graph showing a positional dependence in the main scanning direction of the sagittal line tilt of the exit surface of the first fθ lens in the one embodiment of the present invention.
Figure 7C:
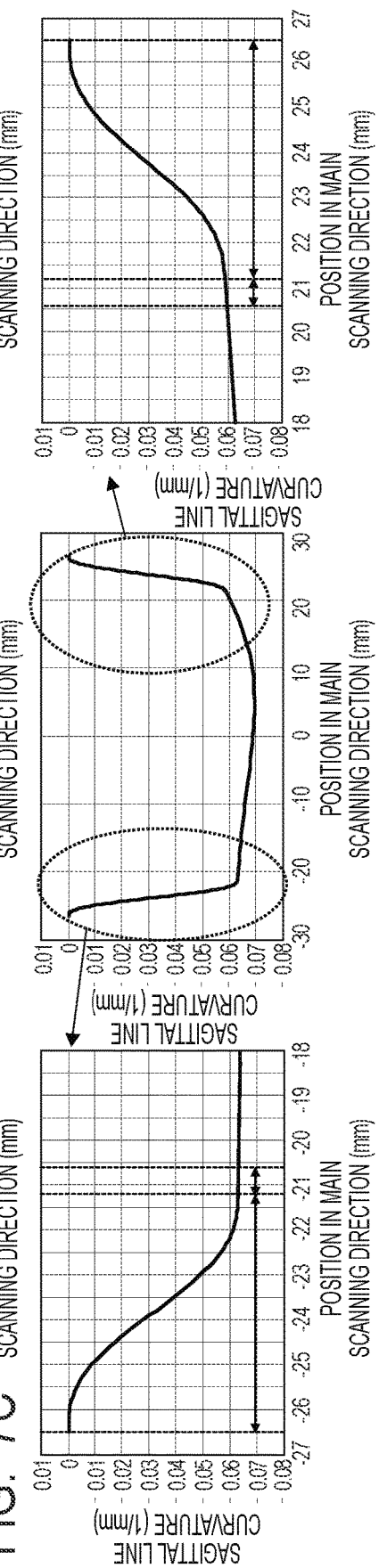
FIG. 7C is a graph showing a positional dependence in the main scanning direction of the sagittal line curvature of the exit surface of the first fθ lens in the one embodiment of the present invention.

FIGS. 7B and 7C show positional dependencies in the main scanning direction of the sagittal line tilt and the sagittal line curvature on the exit surface of the first fθ lens 1006, respectively.

FIG. 8A shows a meridional line shape on the incident surface of the second fθ lens 1007 according to the one embodiment of the present invention.

FIGS. 8B and 8C show positional dependencies in the main scanning direction of the sagittal line tilt and the sagittal line curvature on the incident surface of the second fθ lens 1007, respectively.

FIG. 9A shows a meridional line shape on the exit surface of the second fθ lens 1007.

FIGS. 9B and 9C show positional dependencies in the main scanning direction of the sagittal line tilt and the sagittal line curvature on the exit surface of the second fθ lens 1007, respectively.

In FIGS. 6A and 6C, FIGS. 7A and 7C, FIGS. 8A to 8C, and FIGS. 9A to 9C, an entire view and enlarged views of the image non-effective portions on both sides are shown.

As shown in FIGS. 6A, 7A, 8A and 9A, the positional dependence in the main scanning direction of the position in the optical axis direction in the main scanning cross section including the optical axis is continuous at the connection point on the incident surface and the exit surface of the first fθ lens 1006 and the second fθ lens 1007 according to the one embodiment of the present invention.

In other words, the meridional line shape is continuous between the spline portion and the non-spline portion on the incident surface and the exit surface of the first and second fθ lenses 1006 and 1007.

Further, as shown in FIGS. 6B, 7B, 8B and 9B, the positional dependence in the main scanning direction of the sagittal line tilt is continuous at the connection point on the incident surface and the exit surface of the first and second fθ lenses 1006 and 1007.

In other words, the shape of the sagittal line tilt is continuous between the spline portion and the non-spline portion on the incident surface and the exit surface of the first and second fθ lenses 1006 and 1007.

Furthermore, as shown in FIGS. 6C, 7C, 8C and 9C, the positional dependence in the main scanning direction of the sagittal line curvature is continuous at the connection point on the incident surfaces and the exit surfaces of the first and second fθ lenses 1006 and 1007.

In other words, the shape of the sagittal line curvature is continuous between the spline portion and the non-spline portion on the incident surface and the exit surface of the first and second fθ lenses 1006 and 1007.

As shown in FIGS. 6B, 7B, 8B and 9B, the sagittal line tilt asymptotically approaches (converges to) zero, namely an absolute value of the sagittal line tilt decreases toward the opposite image effective portion side of the spline portion on the incident surface and the exit surface of the first and second fθ lenses 1006 and 1007.

Further, as shown in FIGS. 6C, 7C, 8C and 9C, the sagittal line curvature also asymptotically approaches (converges to) zero, namely the absolute value of the sagittal line curvature decreases toward the opposite image effective portion side of the spline portion on the incident surface and the exit surface of the first and second fθ lenses 1006 and 1007.

Thereby, it is found that the change in the thickness according to the position in the sub-scanning direction in the vicinity of the end at the opposite image effective portion side in the image non-effective portion of the first and second fθ lenses 1006 and 1007 becomes small, so that it is possible to suppress the surface deformation which occurs when the mold is released from them or they shrink and the increase in the birefringence which may occur due to the change in the flow path of the resin when they are molded.

The first and second fθ lenses 1006 and 1007 according to the one embodiment of the present invention are formed by injection molding so as to have a gate (not shown) on the negative side in the main scanning direction.

Since large surface deformation and birefringence occur in the vicinity of the gate, a predetermined interval is generally provided between the gate and the image effective portion.

Further, when a part of the image non-effective portion on only one side is formed in the spline shape on the incident surface and the exit surface of the first and second fθ lenses 1006 and 1007, an asymmetry occurs in the main scanning direction. Accordingly, there is a concern that the surface deformation such as warpage occurs when the mold is released from them or they shrink and the increase in the birefringence occurs due to the change in the flow path of the resin when they are molded.

That is, in order to suppress the surface deformation and the increase in the birefringence, it is required to provide a predetermined interval between both side surfaces and the image effective portion in the main scanning direction and to form a part of the image non-effective portions on both sides in the spline shape such that the incident surface and the exit surface of the first and second fθ lenses 1006 and 1007 have a symmetrical shape.

Next, characteristic numerical values on the incident surface and the exit surface of the first and second fθ lenses 1006 and 1007 according to the one embodiment of the present invention are calculated.

First, a difference $\Delta D_\theta$ between the thickness at the upper end and that at the lower end in the sub-scanning direction according to the sagittal line tilt on each of the incident surface and the exit surface of the first and second fθ lenses 1006 and 1007 is expressed by the following expression (5):

$$\Delta D_\theta = W \times \tan|\theta| \quad (5).$$

In the expression (5), W represents a width in the sub-scanning direction, and θ represents the sagittal line tilt. As shown in Table 4, the widths W of the first and second fθ lenses 1006 and 1007 are 3.4×2=6.8 mm and 3.8×2=7.6 mm, respectively.

Further, the difference $\Delta D_{r'}$ between the thickness at one end in the sub-scanning direction according to the sagittal line curvature and the thickness in the main scanning cross section including the optical axis on each of the incident surface and the exit surface of the first and second fθ lenses 1006 and 1007 is expressed by the following expression (6):

$$\Delta D_{r'} = |r'| \times \left[1 - \cos\left\{\arcsin\left(\frac{W}{2|r'|}\right)\right\}\right]. \quad (6)$$

In the expression (6), r' represents the curvature radius defined by the expression (3) (namely, 1/r' represents the sagittal line curvature). Further, since the shape due to the sagittal line curvature is formed symmetrically between the upper portion and the lower portion in the sub-scanning direction, the expression (6) defines the difference $\Delta D_{r'}$ between the thickness at one end in the sub-scanning direction and the thickness in the main scanning cross section including the optical axis.

Table 6 shows numerical values calculated by using the above-described expressions (5) and (6) for each of the incident surface and the exit surface of the first and second fθ lenses 1006 and 1007 according to the one embodiment of the present invention.

Specifically, Table 6 shows the values of the sagittal line tilt θ, the sagittal line curvature 1/r', the thickness difference $\Delta D_\theta$ according to the sagittal line tilt and the thickness difference $\Delta D_{r'}$ according to the sagittal line curvature at the connection point and at the end (a mirror surface end) on the opposite image effective portion side of the image non-effective portion on the incident surface and the exit surface of the first and second fθ lenses 1006 and 1007.

nection point on at least one optical surface of at least one of the first and second fθ lenses 1006 and 1007.

Accordingly, the total thickness difference $\Delta D_\theta + \Delta D_{r'}$ at the end on the opposite image effective portion side of the image non-effective portion becomes zero on any of the incident surface and the exit surface of the first and second fθ lenses 1006 and 1007.

That is, it is possible to achieve a reduction of the total thickness difference of 2.226 mm which is the largest among the total thickness differences at the respective connection points by forming at least a part of the image non-effective

TABLE 6

| | | | Connection point (mm) | Amount at connection point | Difference in thickness (mm) | Mirror surface end (mm) | Amount at mirror surface end | Difference in thickness (mm) |
|---|---|---|---|---|---|---|---|---|
| First fθ lens 1006 | Incident surface | Sagittal line tilt (minutes) | −18.5 | −467.2 | 0.930 | −25.6 | 0 | 0 |
| | | Sagittal line curvature (1/mm) | −18.5 | −0.025 | 0.145 | | 0 | 0 |
| | Exit surface | Sagittal line tilt (minutes) | −21.2 | −733.9 | 1.474 | −26.5 | 0 | 0 |
| | | Sagittal line curvature (1/mm) | −21.2 | −0.063 | 0.369 | | 0 | 0 |
| Second fθ lens 1007 | Incident surface | Sagittal line tilt (minutes) | −76.7 | −225.3 | 0.446 | −97.5 | 0 | 0 |
| | | Sagittal line curvature (1/mm) | −76.7 | 0.033 | 0.189 | | 0 | 0 |
| | Exit surface | Sagittal line tilt (minutes) | −78.3 | 307.8 | 0.611 | −97.5 | 0 | 0 |
| | | Sagittal line curvature (1/mm) | −78.3 | −0.001 | 0.006 | | 0 | 0 |
| First fθ lens 1006 | Incident surface | Sagittal line tilt (minutes) | 18.5 | −512.0 | 1.140 | 25.6 | 0 | 0 |
| | | Sagittal line curvature (1/mm) | 18.5 | −0.021 | 0.155 | | 0 | 0 |
| | Exit surface | Sagittal line tilt (minutes) | 21.2 | −797.5 | 1.796 | 26.5 | 0 | 0 |
| | | Sagittal line curvature (1/mm) | 21.2 | −0.059 | 0.430 | | 0 | 0 |
| Second fθ lens 1007 | Incident surface | Sagittal line tilt (minutes) | 76.7 | −225.3 | 0.499 | 97.5 | 0 | 0 |
| | | Sagittal line curvature (1/mm) | 76.7 | 0.032 | 0.232 | | 0 | 0 |
| | Exit surface | Sagittal line tilt (minutes) | 78.3 | 301.6 | 0.668 | 97.5 | 0 | 0 |
| | | Sagittal line curvature (1/mm) | 78.3 | −0.001 | 0.007 | | 0 | 0 |

As shown in Table 6, the maximum value of the total thickness difference $\Delta D_\theta + \Delta D_{r'}$ at each connection point is 1.796 mm+0.430 mm=2.226 mm on the positive side in the main scanning direction on the exit surface of the first fθ lens 1006.

On the incident surface and the exit surface of the first and second fθ lenses 1006 and 1007, both of the sagittal line tilt θ and the sagittal line curvature 1/r' become zero at the end on the opposite image effective portion side of the image non-effective portion, namely at the mirror surface end, as described above.

In other words, the absolute value of at least one of the sagittal line tilt and the sagittal line curvature at the end on the opposite image effective portion side of the image non-effective portion becomes smaller than that at the conportion of each of the incident surface and the exit surface of the first and second fθ lenses 1006 and 1007 in the spline shape, as described above.

As shown in Table 5, the spline portion included in the image non-effective portion is set independently for each of the meridional line shape, the sagittal line tilt and the sagittal line curvature on the incident surface and the exit surface of the first and second fθ lenses 1006 and 1007.

That is, it is preferable that a starting point (the connection point) and an end point in the spline portion for each of the meridional line shape, the sagittal line tilt and the sagittal line curvature are optimally set according to various demands for the spline shape for each of the meridional line shape, the sagittal line tilt and the sagittal line curvature, so that they do not need to coincide with each other in the spline portions.

Further, as shown in Table 5, the spline portions for the meridional line shape, the sagittal line tilt and the sagittal line curvature are provided symmetrically between the positive side and the negative side in the main scanning direction on the incident surface and the exit surface of the first and second fθ lenses 1006 and 1007.

However, this structure is for easy understanding of the one embodiment, and the one embodiment is not limited thereto. That is, the spline portions for the meridional line shape, the sagittal line tilt and the sagittal line curvature may be provided asymmetrically between the positive side and the negative side in the main scanning direction.

Further, it is preferable to optimally determine whether or not to provide the constant value region and whether or not to provide the outer shape portion in each of the spline portions for the meridional line shape, the sagittal line tilt and the sagittal line curvature in accordance with various demands for the spline shape for each of the meridional line shape, the sagittal line tilt and the sagittal line curvature on the incident surface and the exit surface of the first and second fθ lenses 1006 and 1007.

In addition, as shown in Table 6, the sagittal line tilt and the sagittal line curvature at the end of the spline portion, namely at the end on the opposite image effective portion side of the image non-effective portion are set to zero on the incident surface and the exit surface of the first and second fθ lenses 1006 and 1007.

However, the one embodiment is not limited thereto, and the sagittal line tilt and the sagittal line curvature at the end on the opposite image effective portion side of the image non-effective portion may not be set to zero, namely may be set to finite values.

That is, as long as the sagittal line tilt and the sagittal line curvature asymptotically approach (converge to) zero at the end on the opposite image effective portion side of the image non-effective portion, the effect of the one embodiment can be obtained.

It is preferable that functions representing the changes in the main scanning direction of the position in the optical axis direction in the main scanning cross section including the optical axis, the sagittal line tilt and the sagittal line curvature are first-order differentiable (differential continuous) at the connection point on the incident surface and the exit surface of the first and second fθ lenses 1006 and 1007.

Thereby, a feeding speed of a cutting tool when the optical mirror surface piece is processed is continuous, so that it is possible to easily reduce an error which may occur when the mold is processed.

Further, it is more preferable that the functions representing the changes in the main scanning direction of the position in the optical axis direction in the main scanning cross section including the optical axis, the sagittal line tilt and the sagittal line curvature are second-order differentiable at the connection point on the incident surface and the exit surface of the first and second fθ lenses 1006 and 1007.

Thereby, a feeding acceleration of a cutting tool when the optical mirror surface piece is processed is continuous, so that it is possible to more easily reduce an error which may occur when the mold is processed.

It is preferable that both of the sagittal line tilt and the sagittal line curvature do not change so as to pass through zero, in other words the signs thereof are not reversed, in still other words, the signs thereof are the same at any point in the spline portion of each of the incident surface and the exit surface of the first and second fθ lenses 1006 and 1007.

If the sign of at least one of the sagittal line tilt and the sagittal line curvature is reversed in the spline portion, a sign of an inclination of the change in the thickness in accordance with the position in the sub-scanning direction is reversed in accordance with the position in the main scanning direction, and the flow path of the resin when they are molded may become complicated, which is not preferable.

As described above, the spline shapes of the sagittal line tilt and the sagittal line curvature are set such that the sagittal line tilt and the sagittal line curvature asymptotically approach (converge to) zero at the end on the opposite image effective portion side of the image non-effective portion on the incident surface and the exit surface of the first and second fθ lenses 1006 and 1007.

Specifically, it is preferable that each of the thickness difference $\Delta D_\theta$ according to the sagittal line tilt and the thickness difference $\Delta D_{r'}$ according to the sagittal line curvature at the end on the opposite image effective portion side of the image non-effective portion is less than 0.2 mm such that the change in the thickness and the change in the flow path of the resin in accordance with the position in the sub-scanning direction do not cause a large problem.

Accordingly, when the length W in the sub-scanning direction is assumed as 7 mm, it is preferable that the absolute value $|\theta|$ of the sagittal line tilt at the end on the opposite image effective portion side of the image non-effective portion is 100 minutes or less from the expression (5).

Further, it is preferable that the absolute value $|1/r'|$ of the sagittal line curvature at the end on the opposite image effective portion side of the image non-effective portion is 0.03 mm$^{-1}$ or less from the expression (6).

By satisfying the above conditions, namely by forming at least a part of the image non-effective portion into the spline shape such that each of the thickness difference $\Delta D_\theta$ according to the sagittal line tilt and the thickness difference $\Delta D_{r'}$ according to the sagittal line curvature at the end on the opposite image effective portion side of the image non-effective portion is less than 0.2 mm, it is possible to sufficiently suppress the surface deformation such as warpage when the mold is released from the lenses or they shrink and the increase in the birefringence due to the change in the flow path of the resin when they are molded.

Further, it is preferable that at least a part of the image non-effective portion is formed in the spline shape on both of the incident surface and the exit surface of the first and second fθ lenses 1006 and 1007.

Thereby, it is possible to further suppress the surface deformation such as warpage when the mold is released from them or they shrink and the increase in the birefringence due to the change in the flow path of the resin when they are molded, as compared with a case where at least a part of the image non-effective portion is formed in the spline shape in only one of the incident surface and the emitting surface.

Further, an outer portion, namely a guard portion may be provided in the sub-scanning direction in the first and second fθ lenses 1006 and 1007 according to the one embodiment of the present invention.

Thereby, it is possible to improve handling and to reduce a risk of contact with the image effective portion.

Structures such as a position structure when positioned in the light scanning apparatus 10 and an ejector structure when ejected from the mold after molded in the first and second fθ lenses 1006 and 1007 according to the one embodiment of the present invention are not limited by the above-described characteristic structures.

For example, the mold for molding the position structure in the optical axis direction and the ejector structure is often provided in the outer piece for molding the outer portion for an fθ lens with the outer portion such as the first and second fθ lenses 5006 and 5007 provided in the comparative example.

On the other hand, the position structure and the ejector structure can be provided by hollowing out a part of the optical mirror surface piece to install the mold for molding the position structure and the ejector structure in the second fθ lens 1007 according to the one embodiment of the present invention in which the outer portion is not formed, for example.

As described above, at least a part of the image non-effective portion is formed in the spline shape on the incident surface and the exit surface of the first and second fθ lenses 1006 and 1007 provided in the light scanning apparatus 10 according to the one embodiment of the present invention.

Then, each of the functions representing the meridional line shape, the change of the sagittal line tilt in the main scanning direction, and the change of the sagittal line curvature in the main scanning direction is continuous but is not infinitely differentiable at a predetermined position in the image non-effective portion on the incident surface and the exit surface of the provided first and second fθ lenses 1006 and 1007.

In addition, the absolute values of the sagittal line tilt and the sagittal line curvature at the end on the opposite image effective portion side of the image non-effective portion are smaller than those at the connection point, respectively, on the incident surface and the exit surface of the provided first and second fθ lenses 1006 and 1007.

Thereby, a change in the shape (particularly, the thickness) in the main scanning cross section in accordance with the position in the sub-scanning direction can be suppressed to suppress the surface deformation which occurs when the mold is released from them or they shrink and the increase in the birefringence which may occur due to the change in the flow path of the resin when they are molded.

Then, it is possible to suppress a decrease in printing performance by providing the first and second fθ lenses 1006 and 1007 formed in such a way in the light scanning apparatus 10 according to the one embodiment of the present invention.

Although preferred embodiments have been described above, the present invention is not limited to these embodiments, and various modifications and changes can be made within the scope of the gist of the present invention.

According to the present invention, it is possible to provide the light scanning apparatus including an imaging optical element in which the deformation of the optical surface and the birefringence are sufficiently suppressed.

[Image Forming Apparatus]

Figure 10:
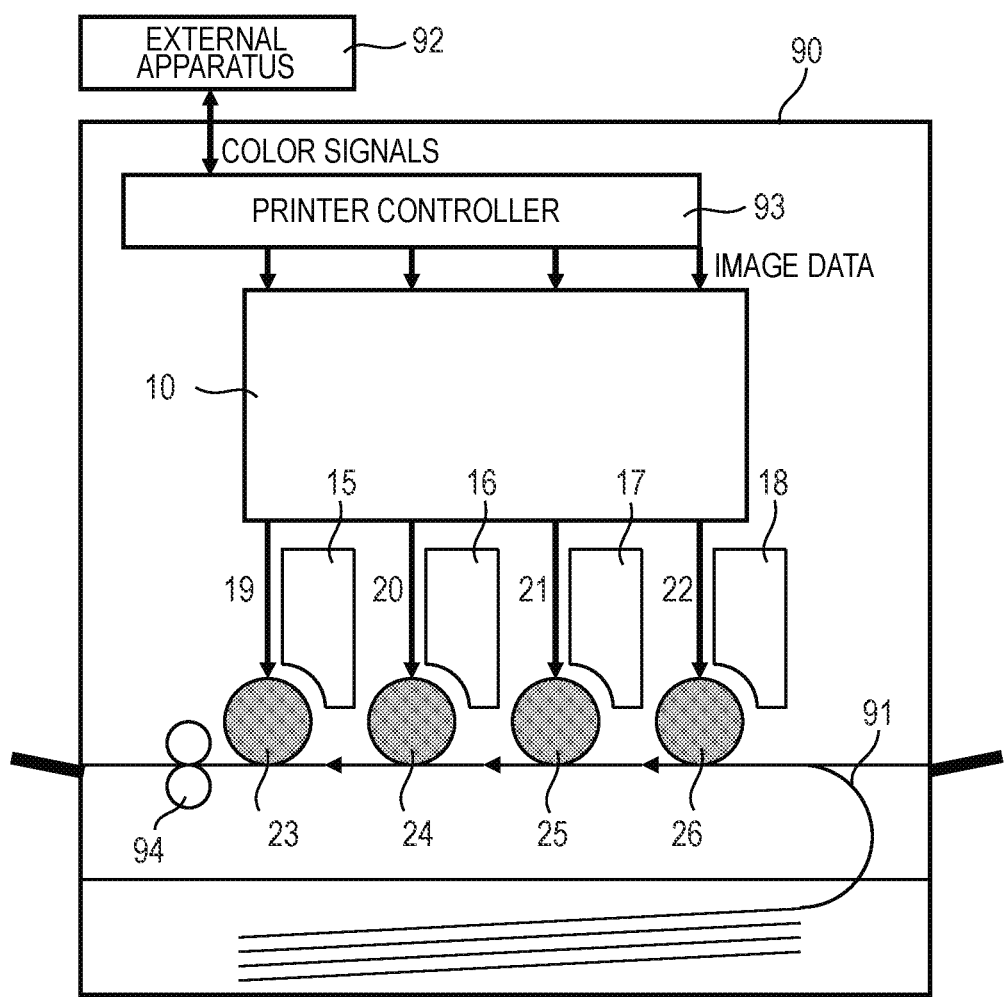
FIG. 10 is a sub-scanning cross sectional view of a main part of a color image forming apparatus according to the present invention.

FIG. 10 shows a sub-scanning cross sectional view of a main part of an image forming apparatus 90 in which the light scanning apparatus 10 according to the present invention is mounted.

The image forming apparatus 90 is a tandem-type color image forming apparatus that records image information on a surface of each photosensitive drum serving as an image bearing member by using the light scanning apparatus 10 according to the present invention.

The image forming apparatus 90 includes the light scanning apparatus 10 according to the present invention, photosensitive drums (photosensitive members) 23, 24, 25 and 26 serving as image bearing members, and developing units 15, 16, 17 and 18. Further, the image forming apparatus 90 includes a conveying belt 91, a printer controller 93 and a fixing unit 94.

Color signals (code data) of R (red), G (green) and B (blue) output from an external apparatus 92 such as a personal computer are input to the image forming apparatus 90.

The input color signals are converted into image data (dot data) of C (cyan), M (magenta), Y (yellow) and K (black) by the printer controller 93 in the image forming apparatus 90.

The converted image data is input to the light scanning apparatus 10. Then, light beams 19, 20, 21 and 22 modulated in accordance with the image data are emitted from the light scanning apparatus 10, and photosensitive surfaces of the photosensitive drums 23, 24, 25 and 26 are exposed to these light beams.

Charging rollers (not shown) for uniformly charging the surfaces of the photosensitive drums 23, 24, 25 and 26 are provided so as to abut on the surfaces. Then, the surfaces of the photosensitive drums 23, 24, 25 and 26 charged by the charging rollers are irradiated with the light beams 19, 20, 21 and 22 by the light scanning apparatus 10.

As described above, the light beams 19, 20, 21 and 22 are modulated based on the image data of the respective colors, and electrostatic latent images are formed on the surfaces of the photosensitive drums 23, 24, 25 and 26 by irradiating the surfaces with the light beams 19, 20, 21 and 22. Then, the formed electrostatic latent images are developed as toner images by the developing units 15, 16, 17 and 18 arranged so as to abut on the photosensitive drums 23, 24, 25 and 26.

The toner images developed by the developing units 15 to 18 are multiply transferred onto a sheet (a transferred material) (not shown) conveyed on the conveying belt 91 by a transferring roller (a transferring unit) (not shown) arranged so as to face the photosensitive drums 23 to 26, thereby forming one full-color image.

As described above, the sheet on which the unfixed toner image is transferred is further conveyed to a fixing unit 94 provided on a rear side (a left side in FIG. 10) of the photosensitive drums 23, 24, 25 and 26. The fixing unit 94 includes a fixing roller having a fixing heater (not shown) therein, and a pressuring roller arranged so as to be in pressure contact with the fixing roller. The sheet conveyed from the transferring portion is heated with being pressed by a pressure contact portion between the fixing roller and the pressuring roller, thereby the unfixed toner image on the sheet is fixed. Further, a sheet discharging roller (not shown) is arranged behind the fixing roller, and the sheet discharging roller discharges the fixed sheet to the outside of the image forming apparatus 90.

The color image forming apparatus 90 records image signals (image information) on the photosensitive surfaces of the photosensitive drums 23, 24, 25 and 26 corresponding to the respective colors of C, M, Y and K by using the light scanning apparatus 10 to print a color image at high speed.

As the external apparatus 92, a color image reading apparatus including a CCD sensor may be used. In this case, the color image reading apparatus and the color image forming apparatus 90 form a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-112257, filed Jul. 13, 2022, which is hereby incorporated by reference herein in its entirety.

What is claimed is:

1. A light scanning apparatus comprising:

a deflecting unit configured to deflect a light flux to scan an effective region of a scanned surface in a main scanning direction; and an imaging optical element configured to guide the light flux deflected by the deflecting unit to the effective region, wherein each of optical surfaces of the imaging optical element includes an effective portion on which the light flux traveling toward the effective region is incident, and two non-effective portions provided on both sides in the main scanning direction of the effective portion, wherein, when each of a change in a sagittal line tilt amount and a change in a sagittal line curvature in the main scanning direction on at least one of the optical surfaces is represented by a function, at least one of the functions is continuous and is not infinitely differentiable at a predetermined position on each of the two non-effective portions, wherein, with respect to at least one of the sagittal line tilt amount and the sagittal line curvature, an absolute value at a first end of each of the two non-effective portions on a side opposite to the effective portion is smaller than an absolute value at the predetermined position on each of the two non-effective portions, and wherein at least one of the two non-effective portions includes a spline shaped region connected to the predetermined position and located on the side opposite to the effective portion with respect to the predetermined position in the main scanning direction.

2. The light scanning apparatus according to claim 1, wherein the function is first-order differentiable at the predetermined position.

3. The light scanning apparatus according to claim 2, wherein the function is second-order differentiable at the predetermined position.

4. The light scanning apparatus according to claim 1, wherein at least one of the sagittal line tilt amount and the sagittal line curvature has the same sign at any position between the predetermined position and the first end in the main scanning direction.

5. The light scanning apparatus according to claim 1, wherein at least one of the sagittal line tilt amount and the sagittal line curvature does not change in a predetermined region between the predetermined position and the first end in the main scanning direction.

6. The light scanning apparatus according to claim 1, wherein the absolute value of the sagittal line tilt amount at the first end is 100 minutes or less.

7. The light scanning apparatus according to claim 1, wherein the absolute value of the sagittal line curvature at the first end is 0.03 mm-1 or less.

8. The light scanning apparatus according to claim 1, wherein, when a change in the main scanning direction of a position in a direction parallel to an optical axis of the at least one optical surface in a main scanning cross section including the optical axis is represented by a function, the function is continuous and is not infinitely differentiable at a predetermined position on each of the two non-effective portions.

9. The light scanning apparatus according to claim 8, wherein the position in the direction parallel to the optical axis does not change in a predetermined region between the predetermined position and the first end in the main scanning direction.

10. The light scanning apparatus according to claim 1, wherein a tangential line at any position in the main scanning direction in a main scanning cross section including any position in the sub-scanning direction forms an angle of 45° or more with respect to a direction parallel to an optical axis on a portion other than the effective portion of the at least one optical surface.

11. The light scanning apparatus according to claim 1, wherein an outer portion is not formed on the at least one optical surface.

12. The light scanning apparatus according to claim 11, wherein a mark is formed on an upper surface of the imaging optical element at a second end on an effective portion side of each of the two non-effective portions.

13. The light scanning apparatus according to claim 1,
wherein, when each of the change in the sagittal line tilt amount and the change in the sagittal line curvature in the main scanning direction on both of the optical surfaces is represented by a function, at least one of the functions is continuous and is not infinitely differentiable at the predetermined position on each of the two non-effective portions, and wherein, with respect to at least one of the sagittal line tilt amount and the sagittal line curvature, the absolute value at the first end is smaller than the absolute value at the predetermined position on each of the two non-effective portions.

14. An image forming apparatus comprising:
the light scanning apparatus according to claim 1;
a developing unit configured to develop an electrostatic latent image formed on the scanned surface by the light scanning apparatus, as a toner image;
a transferring unit configured to transfer the developed toner image to a transferred material; and
a fixing unit configured to fix the transferred toner image to the transferred material.

15. An image forming apparatus comprising:
the light scanning apparatus according to claim 1; and
a printer controller configured to convert a signal output from an external apparatus into image data to input the image data to the light scanning apparatus.

* * * * *